(12) United States Patent
Oikawa et al.

(10) Patent No.: US 6,982,410 B2
(45) Date of Patent: Jan. 3, 2006

(54) PHOTOELECTRIC SENSOR WITH DEFLECTION ANGLE ADJUSTMENT ARRANGEMENT

(75) Inventors: Takahiro Oikawa, Kameoka (JP); Tadashi Senga, Maizuru (JP)

(73) Assignee: Omron Corporation, Kyoto (JP)

( * ) Notice: Subject to any disclaimer, the term of this patent is extended or adjusted under 35 U.S.C. 154(b) by 141 days.

(21) Appl. No.: 10/633,595

(22) Filed: Aug. 5, 2003

(65) Prior Publication Data

US 2004/0079871 A1    Apr. 29, 2004

(30) Foreign Application Priority Data

Aug. 7, 2002   (JP)   ............... 2002-229540

(51) Int. Cl.
  *G06M 7/00*   (2006.01)
  *H01J 40/14*  (2006.01)
(52) U.S. Cl. ............ 250/221; 250/222.1; 250/234; 340/555
(58) Field of Classification Search .......... 250/221, 250/222.1, 234, 235; 340/555–557; 355/55–56, 355/67–68
  See application file for complete search history.

(56) References Cited

U.S. PATENT DOCUMENTS 4,782,224 A * 11/1988 Haas et al. ............... 250/221
4,916,536 A    4/1990 Kerr et al.
5,109,161 A    4/1992 Horiuchi et al.
5,528,027 A *  6/1996 Mizutani ................... 250/234
5,760,390 A *  6/1998 Vezzalini et al. ........... 250/221

FOREIGN PATENT DOCUMENTS

| DE | 37 29 334 A1 | 3/1989 |
| EP | 0 255 305 A2 | 7/1987 |
| JP | 2001-264453 A | 9/2001 |
| WO | WO 92/07233 | 4/1992 |

* cited by examiner

*Primary Examiner*—David Porta
*Assistant Examiner*—Patrick J. Lee
(74) *Attorney, Agent, or Firm*—Foley & Lardner LLP

(57) ABSTRACT

A photoelectric sensor includes: a light projecting section projecting detection medium light to a detection object region; and a light receiving section receiving reflecting light or transmitted light from the detection object region, the sections being in a single piece or in separate pieces. The light projecting section includes: a light source generating the detection medium light; and a light projecting lens for collimating or collecting the detection medium light from the light source to form a beam spot or a light collecting point in the detection object region. The light projecting section further includes: a deflection angle adjusting unit capable of finely adjusting an optical axis deflection angle of the detection medium light projected to the detection object region from the light projecting section.

16 Claims, 27 Drawing Sheets

Schematic diagram showing electrical and optical configuration of sensor head section First pair of descriptive views for workings of optical system capable of adjusting deflection angle (1)

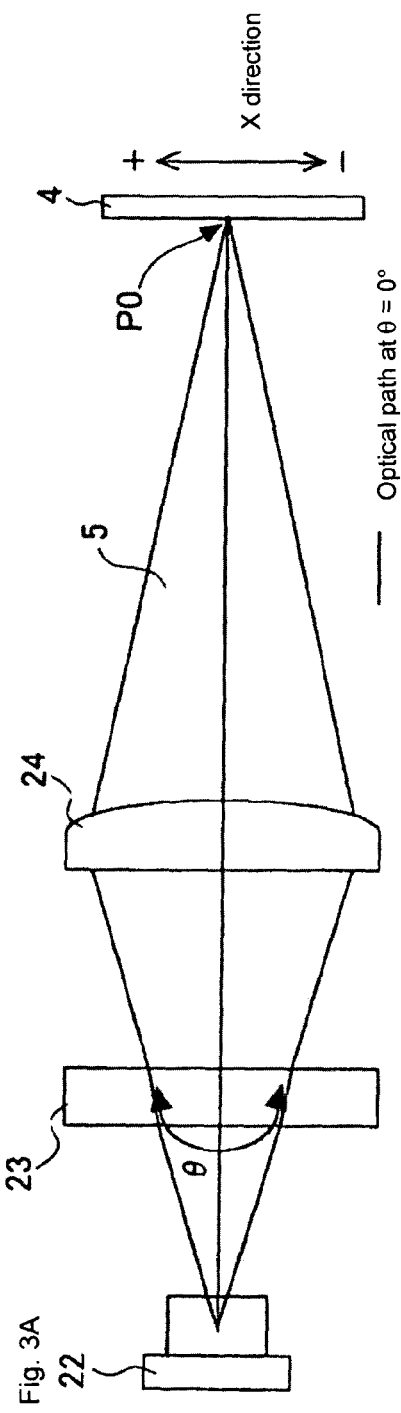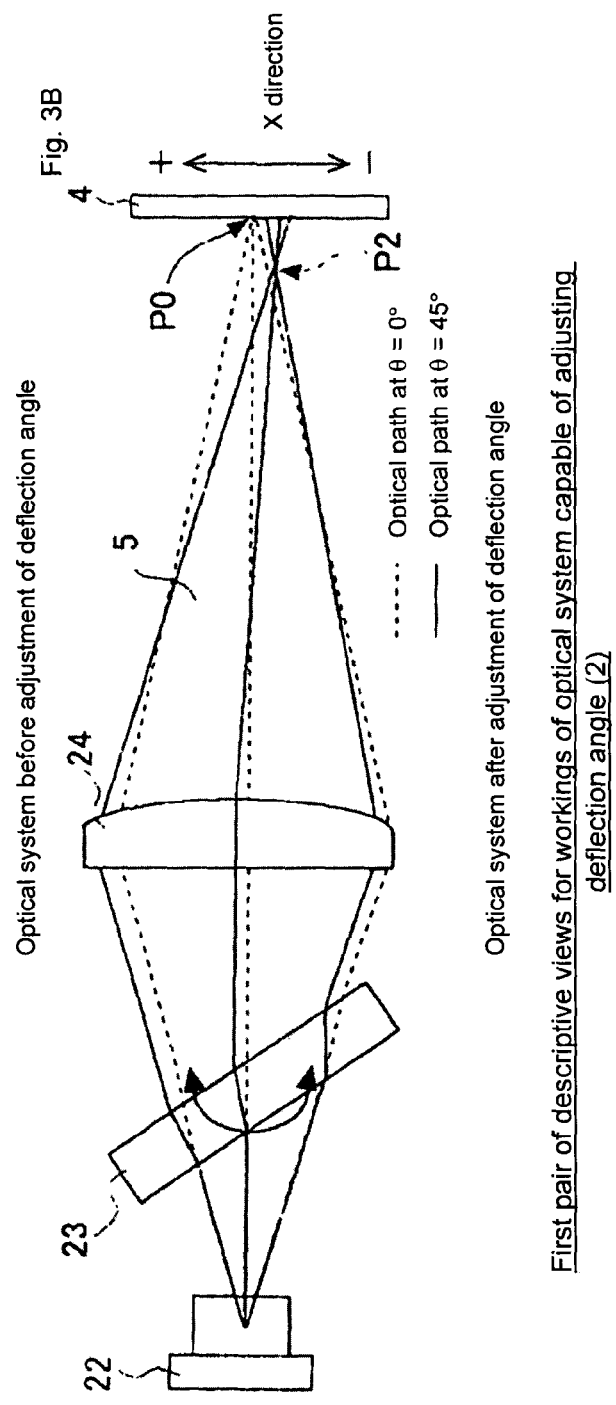
First pair of descriptive views for workings of optical system capable of adjusting deflection angle (2)

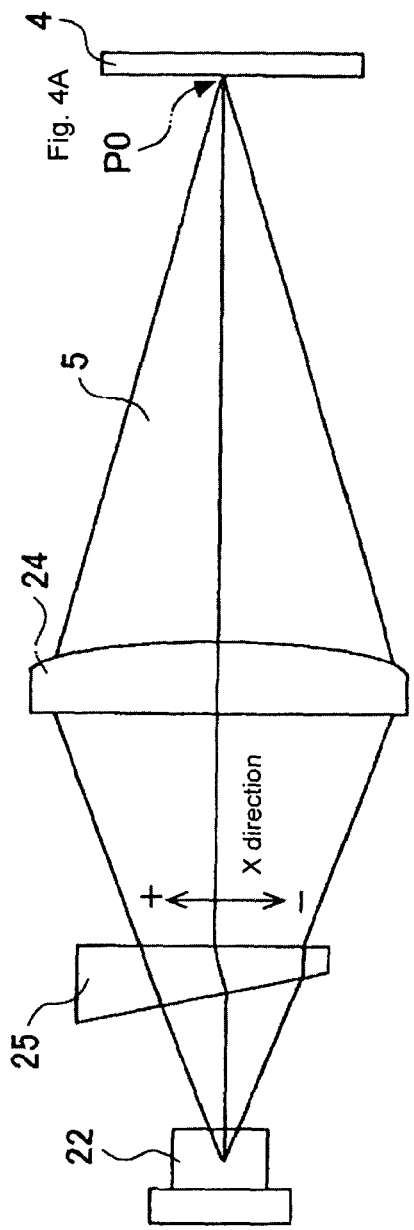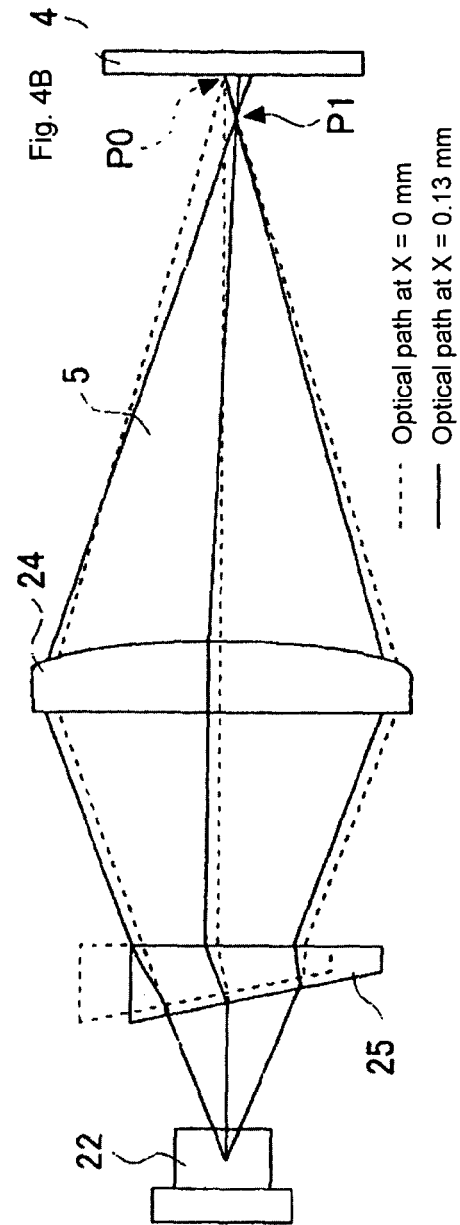

First pair of descriptive views for workings of optical system capable of adjusting deflection angle (4)

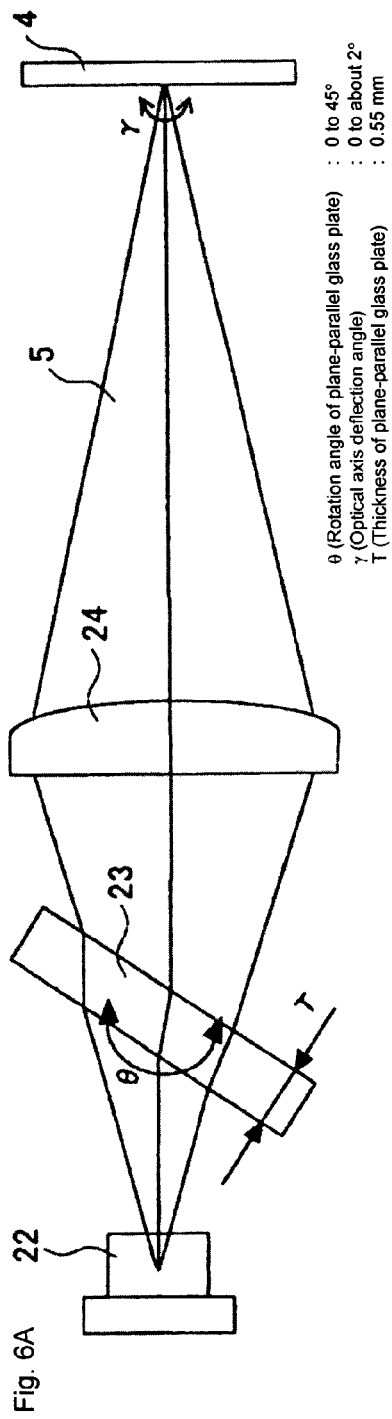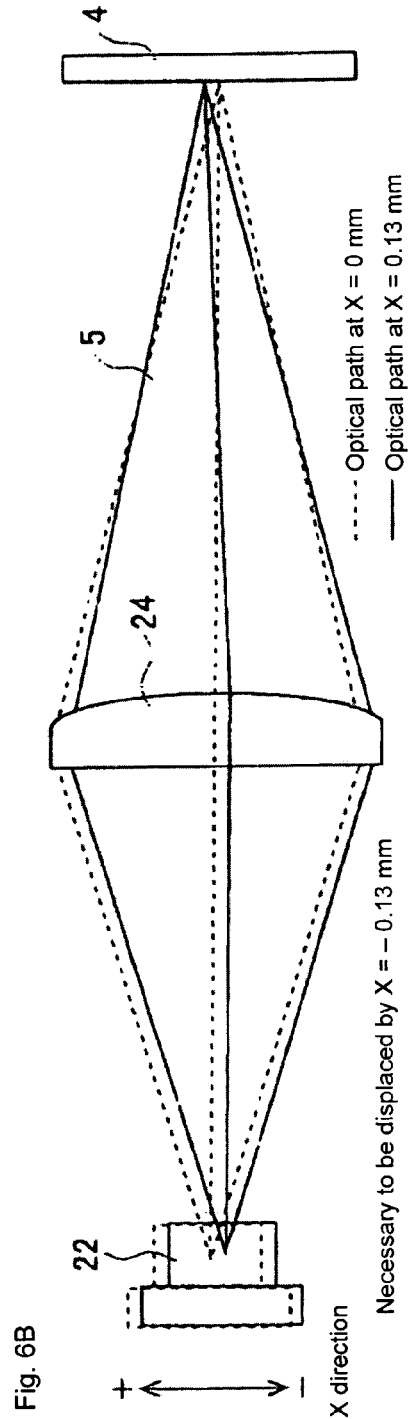

θ (Rotation angle of plane-parallel glass plate) : 0 to 45°
γ (Optical axis deflection angle) : 0 to about 2°
T (Thickness of plane-parallel glass plate) : 0.55 mm ----- Optical path at X = 0 mm
—— Optical path at X = 0.13 mm X direction Necessary to be displaced by X = − 0.13 mm Descriptive views showing as comparison fine adjustment effect of plane-parallel glass plate rotation mechanism and case where fine adjustment effect equal to that of the mechanism is obtained by displacing position of light source Descriptive view for workings of optical system capable of adjusting deflection angle and light beam Right, rear perspective view of sensor head Left, front perspective view of a sensor head Right, top perspective view of optical base on which various optical part blocks are mounted Exploded perspective view showing optical part blocks constructing light projecting section, which is picked from Fig. 10

Perspective view of optical axis adjustment block

Perspective view of light projecting lens block

Exploded perspective view of sensor head capable of adjusting spot diameter

Rear perspective view of option unit capable of adjusting spot diameter

Shape of lens contained in option unit capable of adjusting spot diameter, front view, side view Descriptive views of option unit capable of adjusting spot diameter View showing workings of sensor head unit Graph of characteristic of spot diameter adjustment by sensor head unit Descriptive view for workings in sensor head unit and graph of characteristic of spot diameter adjustment therewith

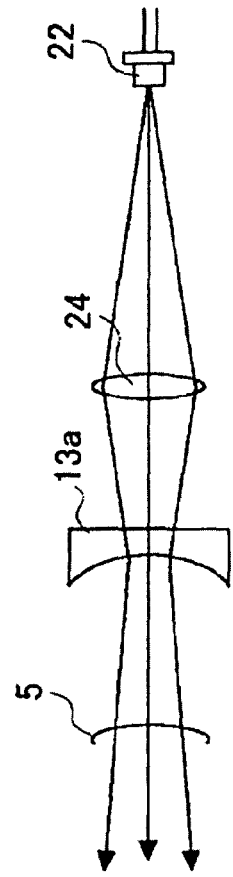
Fig. 17A  Small spot diameter
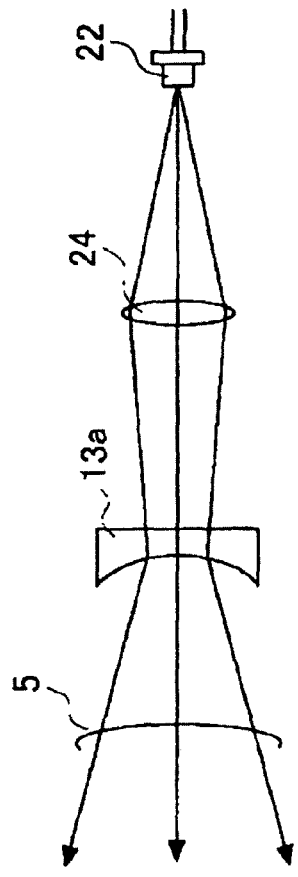
Fig. 17B  Medium spot diameter
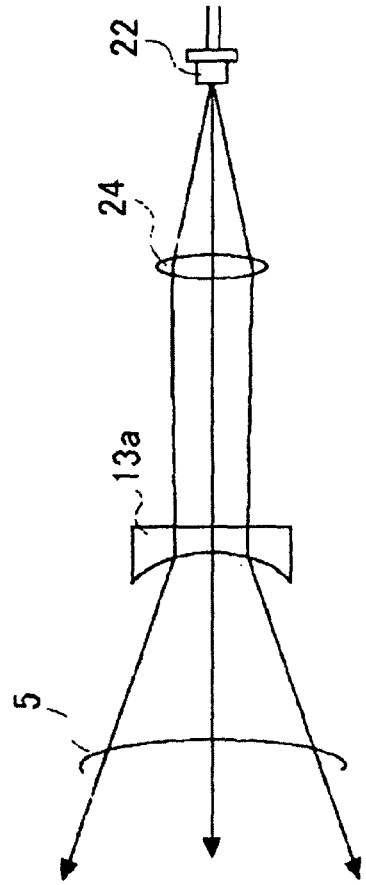
Fig. 17C  Large spot diameter
Descriptive views for workings in spot diameter adjustment

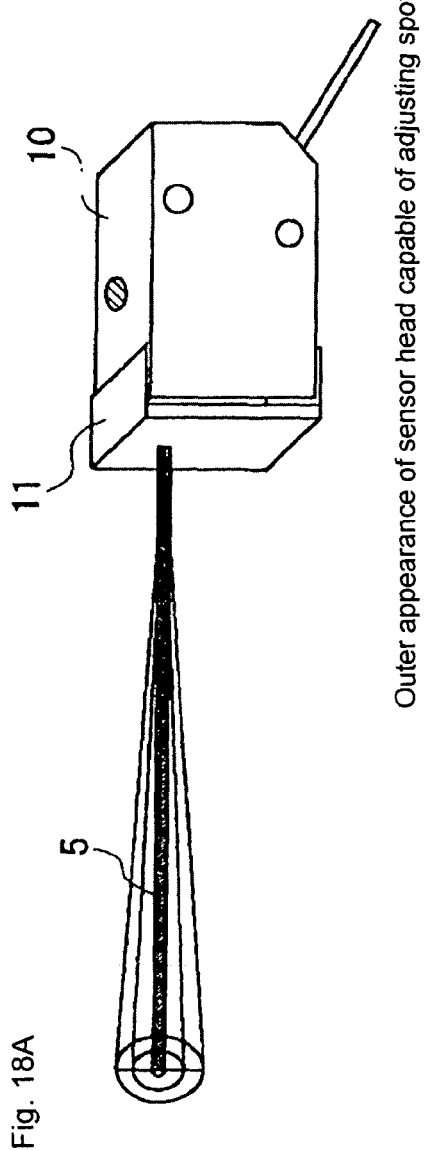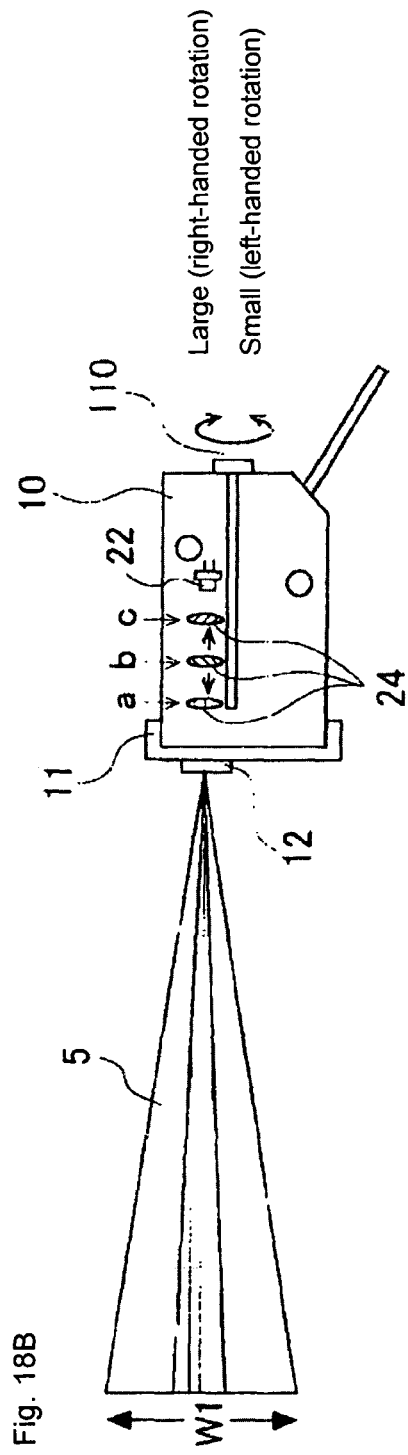
Fig. 18A  Outer appearance of sensor head capable of adjusting spot diameter
Fig. 18B  Internal optical system of sensor head capable of adjusting spot diameter
Descriptive views of sensor head capable of adjusting spot diameter Exploded perspective view of sensor head capable of adjusting width of slit light Fig. 20A
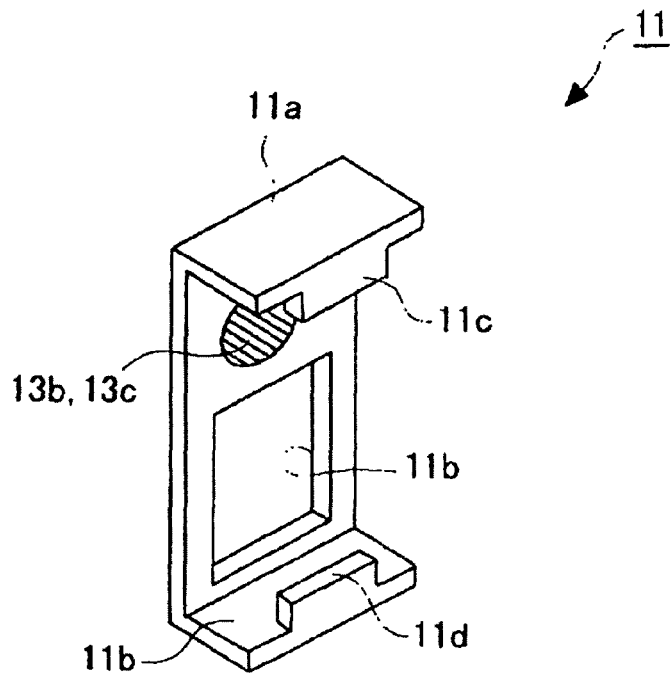
Rear perspective view of option unit capable of adjusting width of slit light
Fig. 20B
(Plan view)
 
(Front view)　　　　　　　(Side view)
Shape of lens contained in option unit capable of adjusting width of slit light
<u>Descriptive views of option unit capable of adjusting width of slit light</u>

Sectional view of option unit (lens being fixed)

Enlarged view of A portion

Descriptive views of lens holding structure of option unit

Sectional view of option unit (lens being rotatable)

Enlarged view of A portion

Descriptive views of lens holding structure of option unit

Descriptive views of sensor head of slit light illumination type

Definition of dimensions of slit light

Change in dimension of slit light

View and graph describing workings in width adjustment of slit light

First example application of slit light illumination type sensor

PHOTOELECTRIC SENSOR WITH DEFLECTION ANGLE ADJUSTMENT ARRANGEMENT

BACKGROUND OF THE INVENTION

1. Field of the Invention

The present invention relates to a photoelectric sensor detecting an object by means of light projection and light reception and, more particularly, to a photoelectric sensor with an increased degree of optical setting freedom as to detection medium light (a projected beam) emitted from a light projection section.

2. Description of the Related Art

Disclosed in JP 2001-264453, A, for example, and others is a long distance type photoelectric sensor for detecting the presence or absence of an object in a production line or the like in a factory. Generally, a photoelectric sensor of this kind is of an amplifier separation type including a sensor head unit and an amplifier unit. As sensor head units, products of various types with different specifications have been available on the market, which are exemplified as follows: a minimum spot reflection type realizing a spot of 50 $\mu$m in diameter at a position of 70 mm±15 mm apart forward from a sensor; a linear beam returning type realizing a spot of about 1.5 mm at a position of 1 m apart forward from a sensor to return the light beam to a sensor head through a reflecting mirror; a long distance area reflection type realizing a beam, in the shape in section of a line, and having about 70 mm in area width at a position of 300 mm apart forward from a sensor; and the like.

In order to perform correct object detection in a long distance type photoelectric sensor of this kind, a projected beam, which is a detection medium light, has to be set in an optimum state adapted for a detection object in a particular situation. Various problems have been traditionally pointed out in connection to setting of the projected beam.

A first problem is of an optical axis deflection angle associated with a projected beam. Deflection angles of projected beams in actual products usually range from a good precision within ±2 degrees of a target optical axis to a poor precision within ±5 degrees of a target optical axis. A deflection angle of the optical axis of a projected beam of 2 degrees would result in deviation of the optical axis of 10 mm at a position of 300 mm apart forward from an emission point. A cause for the presence of an optical axis deflection angle is an eccentricity of a light projecting lens relative to a light projecting element (a light source) and, in order to eliminate such a cause, it is required to raise precision requirements for constituent parts of a sensor head to extremities thereof, which cannot be realized in terms of cost. In such circumstances, even with improvement on positioning precision between a sensor head case and a support member in installment of a sensor, difficulty remains in aligning the optical axis of a projected beam in a correct direction since the projected beam originally has an optical axis deflection angle in the sensor head itself. Therefore, when mounting in an actual scene, a necessity arises for angular and positional adjustment mechanisms interposed between the sensor head case and the support member, raising problems of unfavorable cost performance and a cumbersome installment work. Especially, since an optical axis adjustment tolerance in installment of a long distance type photoelectric sensor of this kind is narrow and delicate, it is considerably difficult to realize an angular adjustment mechanism capable of not only freely changing an angle but also fixing a state having adjusted in angle with certainty, and what's worse, in more of cases an inconvenience has been often encountered that optical, axis deviation occurs for the second time due to a clamping stress caused when being screwed in fixing despite of having completed angular adjustment at the expense of time and labor.

A second problem is that a different sensor product have had to be purchased for each case with different geometrical specifications (such as conversing light, diffusing light, slit light or the like) of a project beam so as to match with the geometrical specifications, though there are almost none of fundamental differences with respect to constituent parts in a sensor head case, which is not only a corresponding burden on the side of a user in terms of economy, but also inconveniences on the side of a maker of the sensors because of increase in the number of sensor products adversely affects a production cost and that accompanying complexity in product management leads to a higher production cost.

SUMMARY OF THE INVENTION

The present invention has been made focusing attention on the problems described above and it is a general object of the present invention to improve a degree of setting freedom in various aspects related to a projected beam in a long distance type photoelectric sensor of this kind.

It is a more concrete object of the present invention to provide a photoelectric sensor capable of performing a fine adjustment of an optical axis deflection angle of a projected beam even with a sensor head case fixed.

It is another more concrete object of the present invention to provide a photoelectric sensor capable of freely setting a shape of a projected beam even with a common sensor head case itself maintained.

Other objects and an action and effect of the present invention will be easily understood by a person skilled in the art with reference to the following detailed description of the present invention.

A photoelectric sensor of the present invention includes: a light projecting section projecting detection medium light to a detection object region; and a light receiving section receiving reflecting light or transmitted light from the detection object region, the sections being in a single piece or in separate pieces. The term "in a single piece" is intended hereby to be a reflection type photoelectric sensor, while the term "in separate pieces" is intended hereby to be a transmission type photoelectric sensor.

The light projecting section includes: a light source generating the detection medium light; and a light projecting lens for collimating or collecting the detection medium light from the light source to form a beam spot or a light collecting point in the detection object region. While, herein, in order to form the light collecting point, a laser light source is preferably adopted as the "light source", no specific limitation is placed thereon. The term "collimating" includes: not only a case where a perfectly parallel rays of light are formed, but also a case (almost parallel rays of light) where a divergent light is formed at a degree of divergence at which a beam spot can be formed without causing an excessive spread of a beam.

The light projecting section further includes; deflection angle adjusting means capable of finely adjusting an optical axis deflection angle of the detection medium light projected to the detection object region from the light projecting section.

With such a construction adopted, even if there exists an optical axis deflection angle of a projected beam because of an eccentricity between a light projecting lens and a light projecting element (a light source), or other reasons, there is included the deflection angle adjusting means capable of finely adjusting an optical deflection angle of a deflection medium light (a projected light) in the light projecting section; therefore, an optical axis deflection angle that a product itself has can be corrected by finely adjusting an optical axis deflection angle using the deflection angle adjusting means. In addition, according to the present invention, since an optical axis deflection angle of a projected beam can be finely adjusted even after installation in an actual scene, second optical axis alignment can be performed using the deflection angle adjusting means without re-installment, even in a case where an optical axis deviation occurs by a stress generated in screwing when being installed, despite of the first optical axis alignment with a certainty in the installation. Therefore, according to the present invention, an installment work can be simply carried out without an angular adjusting mechanism, which would be separately acquired on the side of a user and placed between a sensor head and a support member in construction in a prior art practice, leading to no necessity for a special mounting tool and the angular adjusting mechanism on the side of a user and contributing to reduction in cost.

As a deflection angle adjusting means in an photoelectric sensor of the present invention, there can be adopted a transmissive medium made of glass or the like, having a flat incidence plane for detection medium light and a flat emission plane therefor, and changing an incidence angle of the detection medium light based on a change in position thereof relative to the detection medium light.

As a deflection angle adjustment means, described above, in an photoelectric sensor of the present invention, there can be preferably adopted a plane-parallel glass plate, interposed in an optical path (as a non-parallel light flux) between the light source and the light projecting lens, and supported rotatably about an axis orthogonal to the optical path. The term "plane-parallel glass plate" is a glass plate, being of a uniform thickness, and having both surfaces in parallel to each other.

With a such construction adopted, since the plane-parallel glass plate is supported rotatably about an axis orthogonal to the optical path between the light source and the light projecting lens, an incidence angle relative to the plane-parallel glass plate changes as the plane-parallel glass plate rotates, as a result the optical path is bent at an incidence point and an emission point according to Snell's law and thereby a position of the light source is slightly displaced in a direction intersecting with an optical axis at a right angle as viewed on the light emission side. As a result, a light collecting point in the detection object region is also slightly displaced in company with the imaginary displacement described above of the light source, thereby performing fine adjustment of an optical deflection angle of projected light. At this time, with a very small imaginary displacement amount of the light source accompanying rotation of the plane-parallel glass plate, an adjustment amount of an optical axis deflection angle relative to rotation of the plane-parallel glass plate is extremely slow-going; thereby enabling fine adjustment with a high precision. Note that since with a smaller thickness of the plane-parallel glass plate, an adjustment amount of the optical deflection angle is slower-going, an adjustment of the thickness can also realize a proper adjustment amount of the optical axis deflection angle suitable for an application.

In a preferred embodiment of the present invention, the light source and the light projecting lens are fixed to an optical base in a single piece, the plane-parallel glass plate is rotatably supported by the optical base with a glass holder interposed therebetween, and provided to the glass holder is a volume control operator for a rotation operation of the plane-parallel glass plate.

With such a construction adopted, the plane-parallel glass plate can be directly rotated by an operation to rotate the volume control operator to, in company with the rotation, imaginarily displace a position of the light source by bending the optical path from the light source to the light projecting lens in a proper way; thereby enabling fine adjustment of an optical axis deflection angle, which is the purpose. In addition, the light source, the light projecting lens and the glass holder are mounted on a common optical base to thereby facilitate optical positioning and the optical parts are integrated into a single piece to thereby obtain various advantages in fabrication as well. At this time, by rotatably supporting the glass holder with a cushioning material such as rubber interposed therebetween, a fear can be avoided of displacement of a light collecting point in the detection object region due to movement of the plane-parallel glass plate caused by a shock and a vibration.

In a photoelectric sensor described above of the present invention, it is preferable to have light beam adjusting means for performing distance adjustment of a light collecting point of light emitted from the light projecting lens.

For example, a fine adjustment of an optical axis deflection angle using a plane-parallel glass plate described above causes a change in optical path length in company with a change in optical axis deflection angle, which leads to fears that a position of a light collecting point, that is a light collecting position is displaced or that a size of a beam spot changes. Even in such a case, by performing distance adjustment of the light collecting point with the light beam adjusting means, if equipped, after optical deflection angle adjustment, it is possible to attain a state where a detection object is just in focus or to perform fine adjustment of an optical deflection angle with a desired size of a beam spot, thereby enabling improvement on handlability.

In a preferred embodiment of the present invention, the light beam adjusting means includes a ball screw mechanism supporting the light projecting lens in a freely advancing and retreating manner along the optical axis of the light projecting lens, wherein a volume control operator for a rotational operation is provided at an end of a ball screw thereof.

With such a construction adopted, the ball screw mechanism is caused to work by a rotational operation of the volume control operator to finely advance and retreat the light projecting lens along the optical axis thereof, thereby enabling execution of fine light beam adjustment with a high precision.

A photoelectric sensor of the present invention furthermore includes: a sensor head case having a light projecting window in the front surface; and an option unit, capable of being mounted in a freely mountable/demountable manner at the front surface of the sensor head case, and holding a light beam changing lens at a position aligned with the light projecting window with a lens holder interposed therebetween.

Furthermore, the sensor head case contains: a light source generating detection object light; a light projecting lens collecting the detection medium light from the light source to emit the detection medium light from the light projecting window; and light beam adjusting means for performing distance adjustment of a light collecting point of light emitted from the light projecting window.

With such a construction adopted, since the detection medium light emitted from the light source passes through the light projecting lens in the sensor head case and the light beam changing lens held by the option unit to receive influences of the two lenses and is finally emitted to the outside as the projected beam, a shape of the projected beam can be changed according to a characteristic of the light beam changing lens on the option unit side by performing light collecting point distance adjustment using the light beam adjusting means. Therefore, projected beams having various shapes can be realized with ease by preparing plural kinds of option units with light beam changing lenses different in characteristic from one another for use, even in a common sensor head case to select one of the plural kinds of option units and mount the one onto the common sensor head case. Thereby, on the side of a maker, no necessity arises for preparing a different sensor unit for each projected beam with a different beam shape, which enables not only reduction in mandays but also facilitation of management of parts, while on the other hand, a desired instrumentation system can be realized on the side of a user at a low cost since a sensor case can be used commonly to necessary option units which are only required to purchase.

At this time, by using a light beam changing lens capable of a uniform diffusion along the entire periphery as a light beam changing lens, a projected beam finally emitted from an option unit can be made of a diffusion type with a circular beam section even if a projected beam emitted from a sensor head case itself is of a light collecting type. The term "of a diffusion type" means projected beam having a tendency to spread a sectional shape thereof forwardly.

By adopting a light beam changing lens of a plane diffusion type as a light beam changing lens, there can be realized a projected beam corresponding to a slit light or a line beam.

By making a lens holder holding the light beam changing lens rotatable about the optical axis, in a case where an anisotropic light beam changing lens is used as a light beam changing lens, an anisotropic characteristic of the lens can be rotation-adjusted in company with rotation of the lens holder. Especially, by using a plane diffusion type lens as an anisotropic light beam changing lens, there can be selectively realized a line beam with a vertical plane as a reference plane or a line beam with a horizontal plane as a reference plane, for example.

BRIEF DESCRIPTION OF THE DRAWINGS

FIGS. 3A and 3B are a second pair descriptive views for workings of an optical system capable of adjusting a deflection angle.

FIGS. 4A and 4B are a third pair of descriptive views for workings of an optical system capable of adjusting a deflection angle.

FIGS. 6A and 6B are descriptive views showing as a comparison a fine adjustment effect of a plane-parallel glass plate rotation mechanism and a case where a fine adjustment effect equal to that of the mechanism is obtained by displacing a position of a light source.

FIGS. 17A, 17B and 17C are descriptive views for workings in spot diameter adjustment.
FIGS. 18A and 18B are descriptive views of a sensor head capable of adjusting a spot diameter.
FIGS. 20A and 20B are descriptive views of an option unit capable of adjusting a width of slit light.

DESCRIPTION OF THE PREFERRED EMBODIMENTS

Detailed description will be given of preferred embodiments of the present invention below with reference to the accompanying drawings. Note that needless to say that the following embodiments are shown by way of illustration and example only and the spirit and scope of the present invention are to be defined based on the terms of the appended claims.

Figure 1:
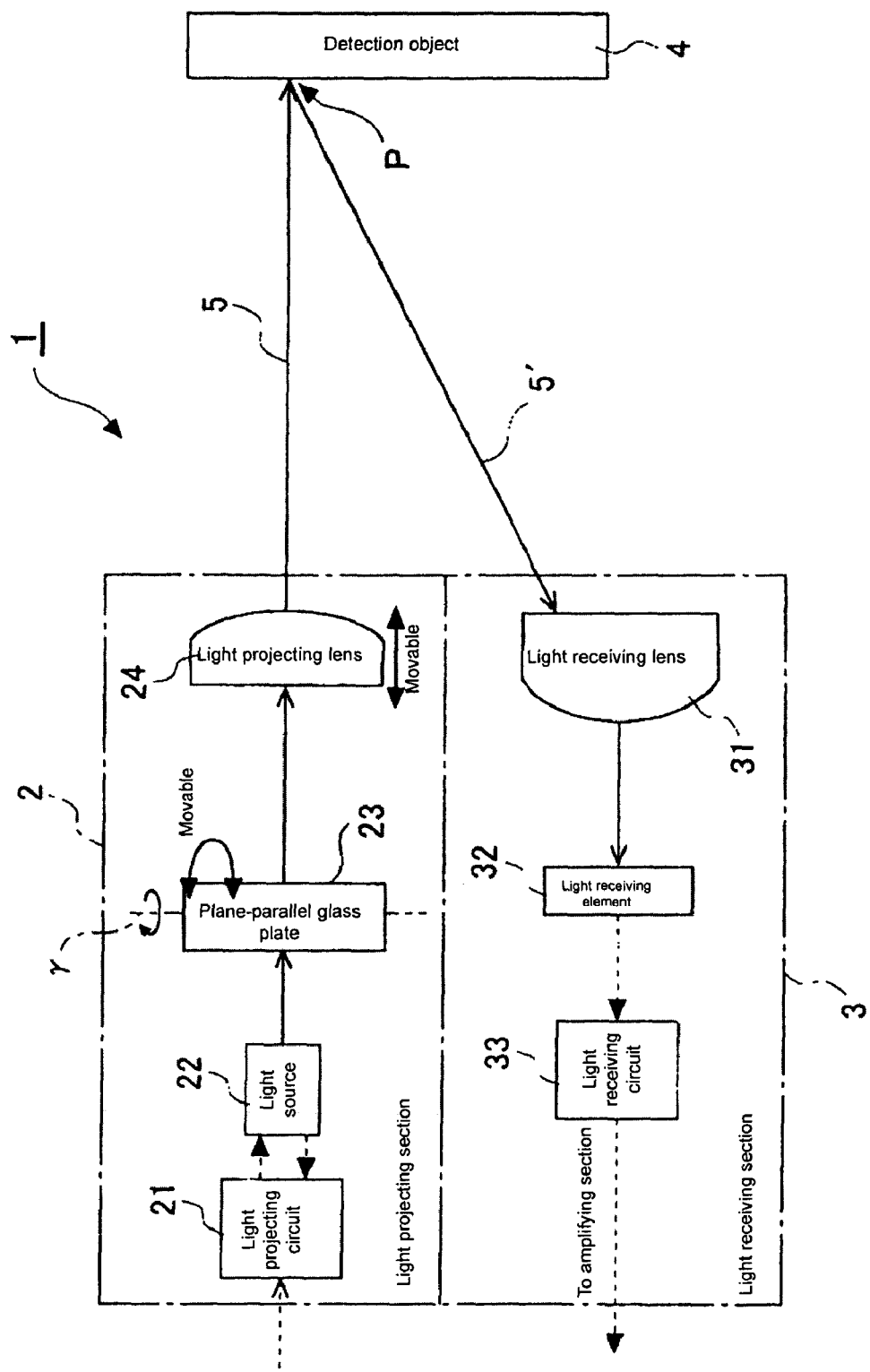
FIG. 1 is a schematic diagram showing an electrical and optical configuration of a sensor head section.

In FIG. 1, there is shown a schematic diagram showing an electrical and optical configuration of a sensor head section to which the present invention is applied. The photoelectric sensor, which is not shown in the figure, is an amplifier separation and diffuse reflection type photoelectric sensor constituted of a sensor head unit and an amplifier unit. In FIG. 1, there is shown main constituents in the sensor unit of the photoelectric sensor. That is, in the figure, a sensor head 1 includes: a light projecting section 2 and a light receiving section 3, both being integrated into a single piece. The light projecting section 2 includes: a light projecting circuit 21; a laser light source 22; a plane-parallel glass plate 23; and a light projecting lens 24.

The light projecting circuit 21 properly drives the laser light source 22 according to a signal supplied from an amplifier section not shown to thereby realize an action of emitting laser light from the laser light source 22. Note that the function of the light projecting circuit 21 also includes: laser power control such as auto power control. As laser light, there can be adopted visual laser light, infrared laser light or the like.

The laser light source 22 includes a semiconductor laser element and generates laser light, which is detection medium light, according to a signal from the light projecting circuit 21 to output the laser light.

The light projecting lens 24 has a function to collect the laser light that is emitted from the laser light source 22 and thereafter transmitted through the plane-parallel glass plate 23 described later and to project the laser light as projected beam 5 to a detection object region. The light projecting lens 24 shown in the figure is supported in a movable manner in an optical axis direction, that is in a freely advancing and retreating manner along an optical axis direction, and by moving the light projecting lens 24 along the optical axis, there can be realized light collecting point distance adjustment (light beam adjustment) of light emitted from the light projecting lens 24.

Note that a member attached with a symbol 4 in the figure is a detection object placed in the detection object region at a position of a suitable distance apart forward from the light projecting lens 24. By performing proper light beam adjustment with the light projecting lens 24 described above, a light collecting point P with a very small diameter is formed on a surface of the detection object 4 from the projected light.

Description will be then given of the plane-parallel glass plate 23, which is a main part of the present invention. The plane-parallel glass plate 23 is a glass plate having a uniform thickness of a suitable value and both surfaces (an incidence plane and emission plane of the laser light) thereof in parallel to each other. The plane-parallel glass plate 23 is supported so as to be rotatable about an axis r orthogonal to the optical axis connecting the laser light source 22 to the light projecting lens 24. By rotating the plane-parallel glass plate 23 by a proper angle, as detailed later, fine adjustment can be realized of an optical axis deflection angle of the projected beam 5.

Description will be then given of the construction of the light receiving section 3. The light receiving section 3 includes: a light receiving lens 31; light receiving elements 32; and a light receiving circuit 33. Part 5' of diffuse reflecting light originated from the light collecting point P formed on the surface of the detection object 4 is directed to the light receiving lens 31. The light receiving lens 31 takes a light collecting action and as a result, the diffuse reflecting light 5' is collected on a light receiving plane of the light receiving element 32.

The light receiving elements 32 are constituted of, for example, a phototransistor, a photodiode and others to generate an electrical signal at a level proportional to a received light amount. The electrical signal generated in the light receiving element 32 is transmitted to the light receiving circuit 33.

The receiving circuit 33 not only amplifies the electrical signal obtained from the light receiving elements 32, but also then transmits the electrical signal to an amplifying section not shown.

In this way, the sensor head 1 shown in FIG. 1 includes: the light projecting section 2 projecting the projected beam 5, which is detection medium light, to the detection object region where the detection object 4 is placed; and the light receiving section 3 receiving the part 5' of diffuse reflecting light from the detection object 4 in the detection object region, both being integrated into a single piece. The light projecting section 2 includes: deflection angle adjusting means capable of finely adjusting an optical axis deflection angle of the projected light, which is detection medium light, projected from the light projecting section 2 to the detection object 4 placed in the detection object region. In this example, the deflection angle adjusting means is placed in the optical axis between the laser light source 22 and the light projecting lens 24, and includes plane-parallel glass plate 23 supported rotatably about the axis r orthogonal to the optical axis.

The light projecting section 2 further includes: light beam adjusting means for performing adjustment of a light collecting point distance of the projected beam 5, which is light emitted from the light projecting lens 24. In this example, a function of the light beam adjusting means is exerted by the light projecting lens 24 supported in a freely advancing and retreating manner along the optical axis.

In FIGS. 2A, 2B and 3A, 3B, there are respectively shown a first pair of descriptive views for workings of an optical system capable of adjusting a deflection angle, and using a plane-parallel glass plate freely rotatable and a second pair of descriptive views for workings of th same. Note that in the figures, there are shown an optical system including the laser light source 22, the plane-parallel glass plate 23 and the light projecting lens 24 as viewed along a direction of the rotation axis r of the plane-parallel glass plate 23. Herein, definition is done such that the direction of the rotation axis r of the plane-parallel glass plate 23 is a Y direction and a direction orthogonal to both of the rotation axis r and the optical axis is an X direction. Furthermore, definition is done such that a rotation angle of the plane-parallel glass plate 23 is θ, wherein θ=0° in a state where the plane-parallel glass plate 23 and the light projecting lens 24 are parallel to each other, and a state where the plane-parallel glass plate is rotated clockwise is in a "+" direction of θ and a state where the plane-parallel glass plate is rotated counterclockwise is in a "−" direction of θ.

Figure 2A:
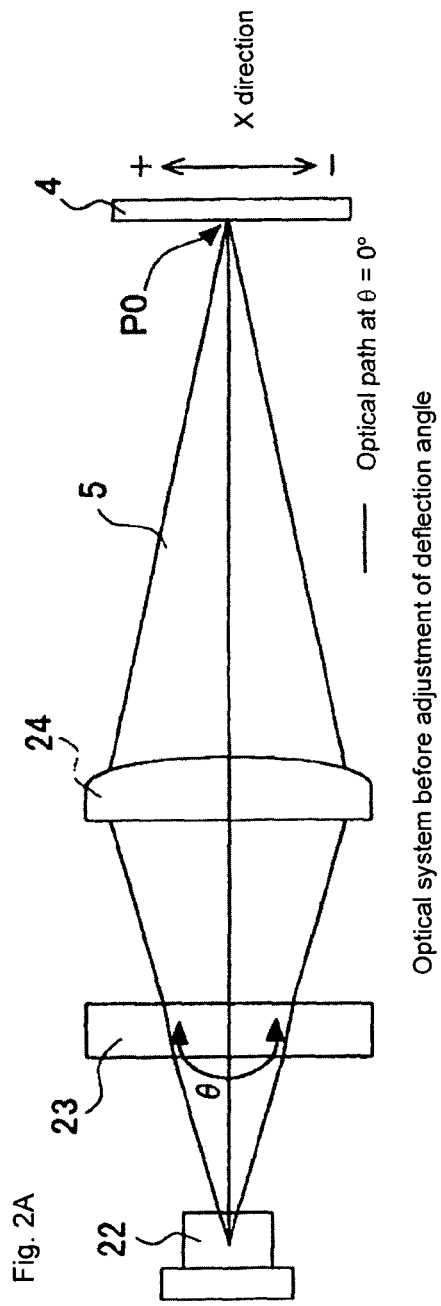
FIGS. 2A and 2B are a first pair of descriptive views for workings of an optical system capable of adjusting a deflection angle.
Figure 2B:
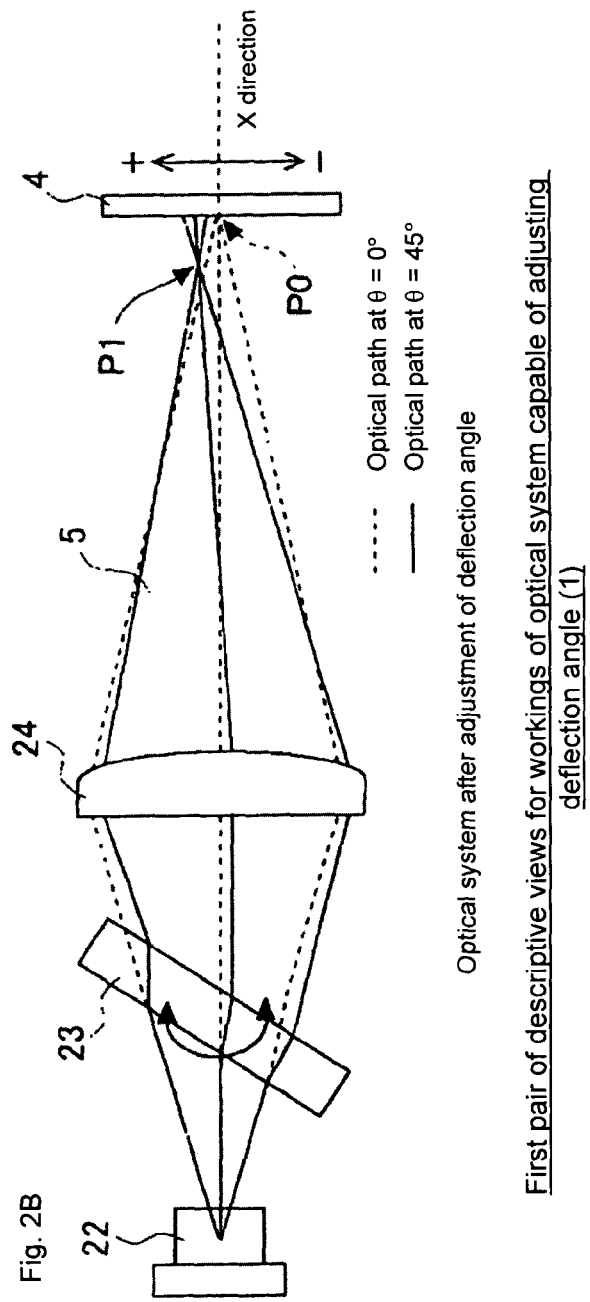

In FIGS. 2A and 2B, there is shown the optical system before adjustment of a deflection angle (θ=0°) and the optical system after adjustment of a deflection angle (θ=+45°) as comparison. That is, as shown in FIG. 2A, in the optical system before adjustment of a deflection angle (θ=0°), since laser light emitted from the laser light source 22 impinges on the plane-parallel glass plate 23 at an incidence angle of 0°, the laser light emitted from the laser light source 22 advances straight on without bending at both of the incidence and emission planes of the plane-parallel glass plate 23. As a result, the laser light emitted from the laser light source 22 advances straight on in a similar way to when no plane-parallel glass exists to reach the light projecting lens 24, so a shape of the projected beam 5 is a collected shape according to a defined characteristic of the projecting lens 24, thereby generating a light collecting point P0 of a very small diameter on the surface of the detection object 4 placed in the detection object region.

In the optical system after adjustment of a deflection angle, as shown in FIG. 2B, laser light emitted from the laser light source 22 impinges on the plane-parallel glass plate 23 at an incidence angle of −45° since the plane-parallel glass plate 23 is in a state being rotated by θ=45°. Therefore, the optical axis is bent at both of the incidence plane and the emission plane of the plane-parallel glass plate 23 and thereby there occurs the same state as when the laser light source 22 is slightly displaced to the "−" side of the X direction as viewed at the position of the light projecting lens 24 as shown with solid lines in the figure. As a result, the light collecting point P1 occurs at a position displaced to the "+" side of the X direction and slightly apart forward from the detection object 4, thereby realizing so-called fine adjustment of an optical axis deflection angle.

Note that, in the optical system after adjustment of a deflection angle, an optical path length from the laser light source 22 to the detection object 4 is extended by a slight length due to a refracting action by the plane-parallel glass plate 23 to thereby displace the light collecting point P1 forward from the detection object correspondingly to extension of the slight length and to increase a spot diameter of an actual projected beam on the detection object 4. An increase in a spot diameter at this level, however, practically has almost no inconvenience in detection. Naturally, a small problem occurs in a case where the detection object 4 is extremely small in size, but the small problem can be solved by adjustment of a light beam described later.

In FIGS. 3A and 3B, there is shown an optical system before adjustment of a deflection angle ($\theta=0°$) and an optical system after adjustment of a deflection angle ($\theta=-45°$) by comparison. In the latter case, since the plane-parallel glass plate 23 is rotated counterclockwise to $\theta=-45°$, laser light emitted from the laser light source 22 impinges on the plane-parallel glass plate 23 at an incidence angle of +45° relative to the glass plate 23; therefore, there occurs the same state as when the laser light source 22 is displaced to the "+" side of the X direction as view at a position of the light projecting lens 24 by bending the optical axis at the light incidence plane and the light emission plane. As a result, a collecting point P2 is generated at a position, slightly apart forward from the detection object 4, and being displaced by a slight length to the "−" side of the X direction, thereby realizing a optical axis deflection angle adjusting function.

Note that at this time as well, a new light collecting point P2 is generated at a position slightly apart forward from the detection object 4 to, as a result, increase an actual spot diameter on the surface of the detection object 4, while no inconvenience occurs in detection similarly to the case described above and even with any inconvenience arisen, a problem from the inconvenience can be solved by displacing a position of the light collecting point P2 in the optical axis direction using a light beam adjusting function described later.

In FIGS. 4A and 4B, there are shown a third pair of descriptive views for workings of an optical system capable of adjusting a deflection angle using a non-plane-parallel glass plate 25 in the shape in section of a wedge. Note that in the figure, the same constituents as in FIGS. 2A, 2B and 3A, 3B are attached by the same marks and none of descriptions thereof will be repeated.

In this example, the non-plane-parallel glass plate 25 in the shape in section of a wedge is interposed between the laser light source 22 and the light projecting lens 24. The glass plate 25 is supported so as to be reciprocatable in the X direction, that is a direction in parallel to the light projecting lens 24.

In the optical system before adjustment of a deflection angle shown in FIG. 4A, the non-plane-parallel glass plate 25 is fixed at a reference position in the X direction and since in this state, laser light emitted from the laser light source 22 impinges on the non-plane-parallel glass plate 25 at a predetermined incidence angle (not 0), the optical axis is bent at both of the incidence plane and the emission plane and then the laser light impinges on the light projecting lens 24 at a right angle relative to the light projecting lens 24. As a result, the optical axis of the projected beam 5 emitted from the light projecting lens 24 coincides with the optical axis of the light projecting lens 24 to generate a light collecting point P0 on the surface of the detection object 4 placed in the detection object region.

In the optical system after adjustment of a deflection angle shown in FIG. 4B, the non-plane-parallel glass plate 25 is, as shown with solid lines in the figure, positioned in a state where the non-plane-parallel glass plate 25 is displaced to the "−" side of the X direction by a predetermined distance. At this time, though no change occurs in the incidence angle and the emission angle on the incidence plane and the emission plane, respectively, of the non-plane-parallel glass plate 25, an optical path length within the non-plane-parallel glass plate 25 increases correspondingly to an increase in thickness and to thereby displace a position of the laser light source 22 as viewed at a position of the projecting lens 24 by a slight length to the "+" side of the X direction. As a result, a light collecting point P1 is, as shown with solid lines in the figure, generated at a position slightly displaced to the "−" side of the X direction and forward apart from the object 4 placed in the detection object region, thereby realizing so-called optical axis deflection angle adjusting function. Even in this case, though a slight increase occur in actual spot diameter generated on the surface of the detection object 4, this increase is at a level at which almost no inconvenience occurs in actual detection. It is natural that in a case of a very small detection object for which the increase in spot diameter is problematic as well, the problem can be solved by displacing a position of the light collecting point P1 in a direction of the optical axis by the light beam adjusting function described later.

Figure 5:
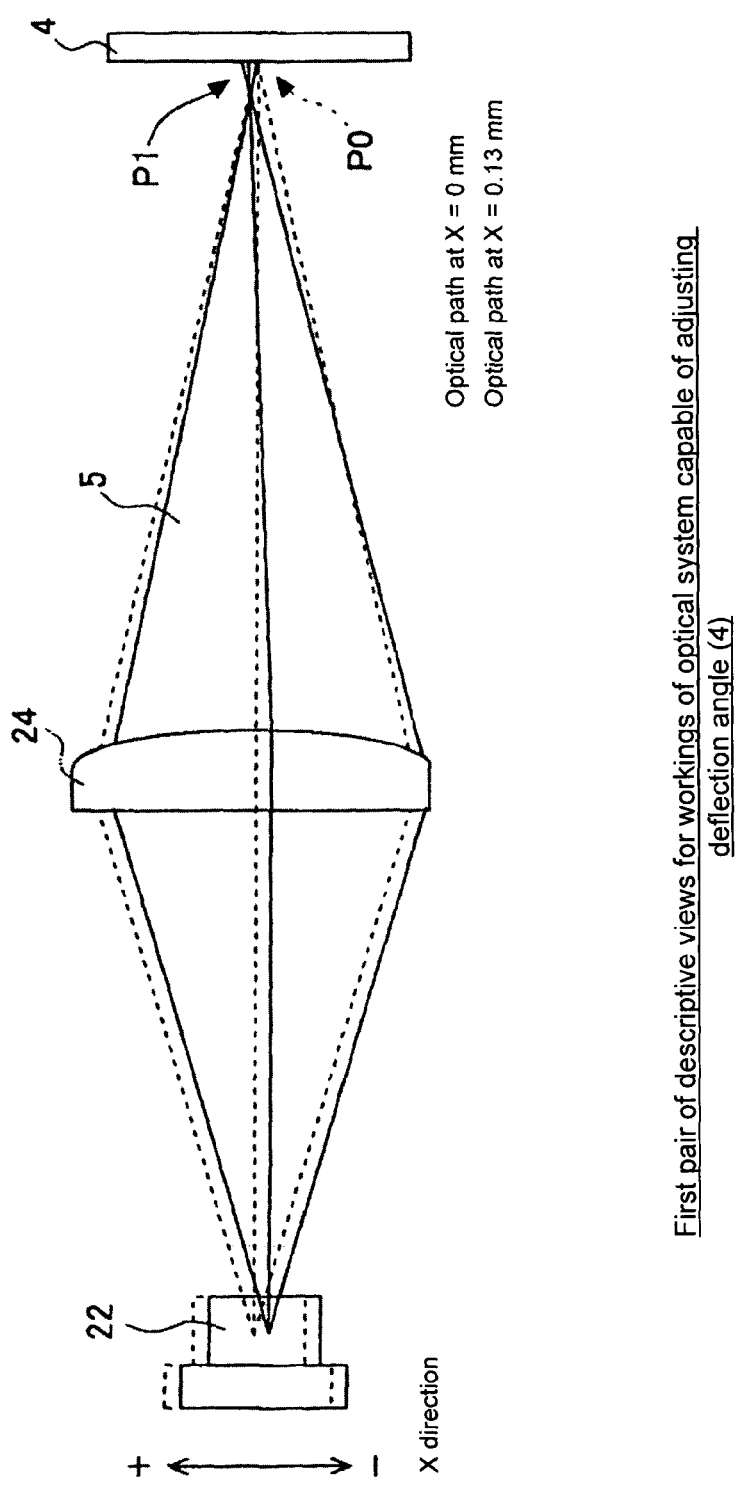
FIG. 5 is a fourth descriptive view for workings of an optical system capable of adjusting a deflection angle.

In FIG. 5, there is shown a fourth descriptive view for workings of an optical system capable of adjusting a deflection angle by displacement of the laser light source 22 itself. Note that in the figure, the same constituents as in FIGS. 2A and 2B to 4A and 4B are attached by the same symbols and none of descriptions will be repeated.

In this example, the laser light source 22 itself is supported so as to be movable on a straight line in the X direction, and the laser light source 22 itself is supported so as to be finely movable in the X direction with a proper moving mechanism by an external operating force.

With such a construction adopted, by finely displacing the laser light source 22 itself in the X direction, as shown with solid lines in the figure, the position of a light collecting point P1 can be displaced in a direction opposite to a direction of displacement of the laser light source 22, thereby enabling the light collecting point P1 to be generated at a position slightly displaced to the "+" side of the X direction in the vicinity of the detection object 4. Note that a problem of an increase in actual spot diameter on the detection object 4 can be corrected using the light beam adjusting function in a similar manner to the case described above.

The three kinds of deflection angle adjusting mechanisms described above can be used with ease in a practical aspect by designing so that a relationship between an operating amount of an operator and an adjusting amount of a deflection angle is properly slow going, while among them, with the deflection angle adjusting mechanisms using a plane-parallel glass plate shown in FIGS. 2A, 2B and 3A, 3B, the relationship between the operating amount and the adjusting amount can be set at a high factor, thereby enabling a fine adjusting mechanism slow-going and good in good operability to be resulted.

That is, in FIGS. 6A and 6B, there are shown descriptive views showing as a comparison a fine adjustment effect of a plane-parallel glass plate rotation mechanism and a case where a fine adjustment effect equal to that of the mechanism is obtained by displacing a position of a light source.

As shown in FIG. 6A, in a case where a thickness of the plane-parallel glass plate 23 is 0.55 mm and an optical axis deflection angle (Y) in the range of from 0° to about 2° is realized, a rotation angle (θ) of the plane-parallel glass plate 23 takes a value in the range of from 0° to 45° to enable an slow-going operability at an extremely high factor to be acquired.

In contrast to this, in a case where the same amount of a light collecting point displacement (for example, 0.13 mm) is realized by displacement of the laser light source 22 in the X direction, the laser light source 22 itself is necessary to be displaced in the X direction by an extremely small amount of −0.13 mm to thereby cause a relationship between an operating amount and an adjusting amount to be very sensitive, which makes it extremely difficult to realize the adjustment by manipulation with finger tips of an operator as far as a buffer mechanism with a considerably high factor is separately designed.

Figure 7:
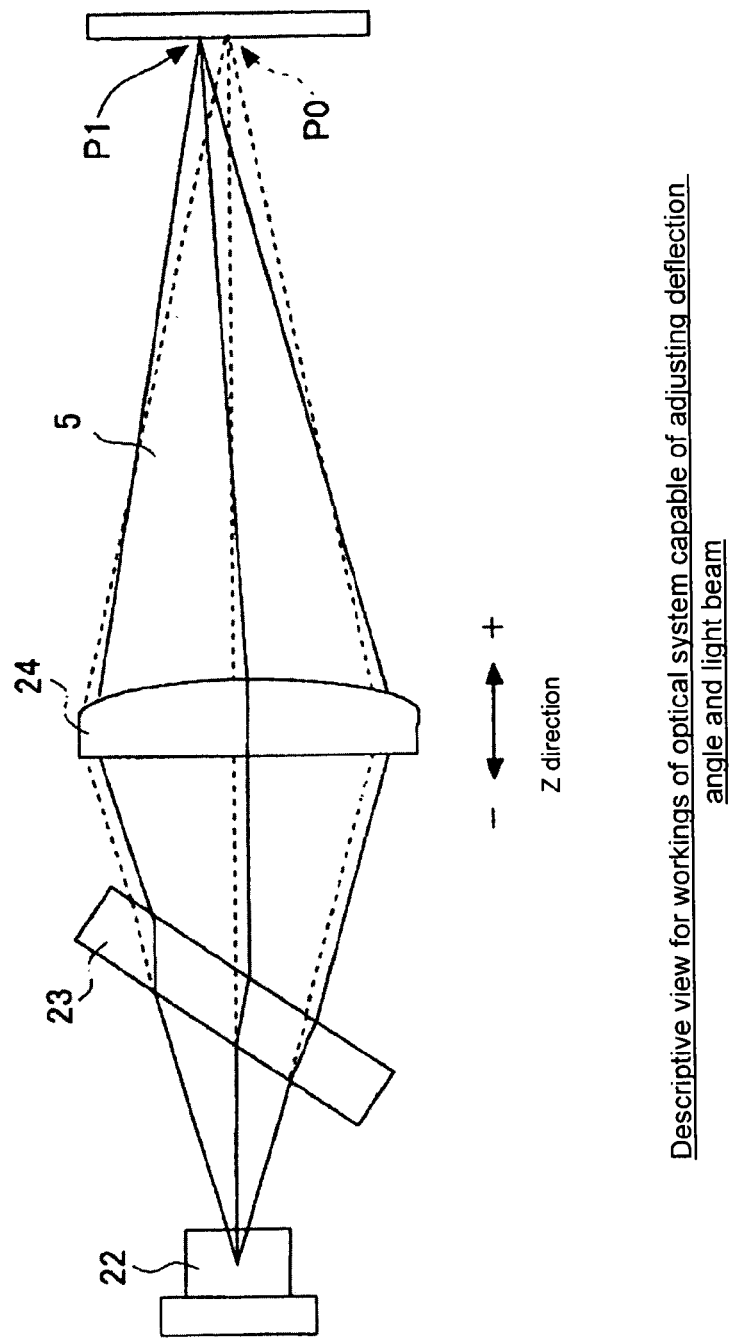
FIG. 7 is a descriptive view for workings of an optical system capable of adjusting a deflection angle and a light beam.

In FIG. 7, there is shown a descriptive view for workings of an optical system capable of adjusting a deflection angle and a light beam, which is repeatedly described above. In this example, by enabling displacement of the collective lens 24 itself in the direction of the optical axis (the Z direction) a position of the light collecting point P1 displaced forward away from the surface of the detection object 4 in the direction of the optical axis by deflection angle adjustment can be corrected toward the surface of the detection object 4.

That is, as described above in FIGS. 2A and 2B to 4A and 4B, by increasing an optical path length from the laser light source 22 to the detection object 4 through deflection angle adjustment, the new light collecting points P1 or P2 is displaced to a position slightly apart forward from the detection object 4 and, as a result, an increase occur in actual spot diameter on the detection object 4 (into a fuzziness state). As shown in FIG. 7, however, by displacing the collective lens 24 along the optical axis, an optical path length is corrected correspondingly to the displacement to thereby displace a position of a new light collecting point Pt toward the surface of the detection object 4, thereby enabling a very small spot of the surface of the detection object 4 to be normally generated. Therefore, even in a case of a very small detection object such as a rice grain or a thread, by using deflection angle adjustment and light beam adjustment of the present invention, a change in reflecting light amount according to the presence or absence of the detection object can be made clear and definite illuminating the detection object with a projected beam correctly, thereby enabling a detection precision to be raised.

While conceptual description is given of the present invention according to model views, needless to say that a photoelectric sensor of the present invention can be realized as a sensor head unit of a size and shape properly selected. In FIGS. 8 to 13, there is shown an example of a concrete structure of the sensor head unit thus realized.

Figure 8:
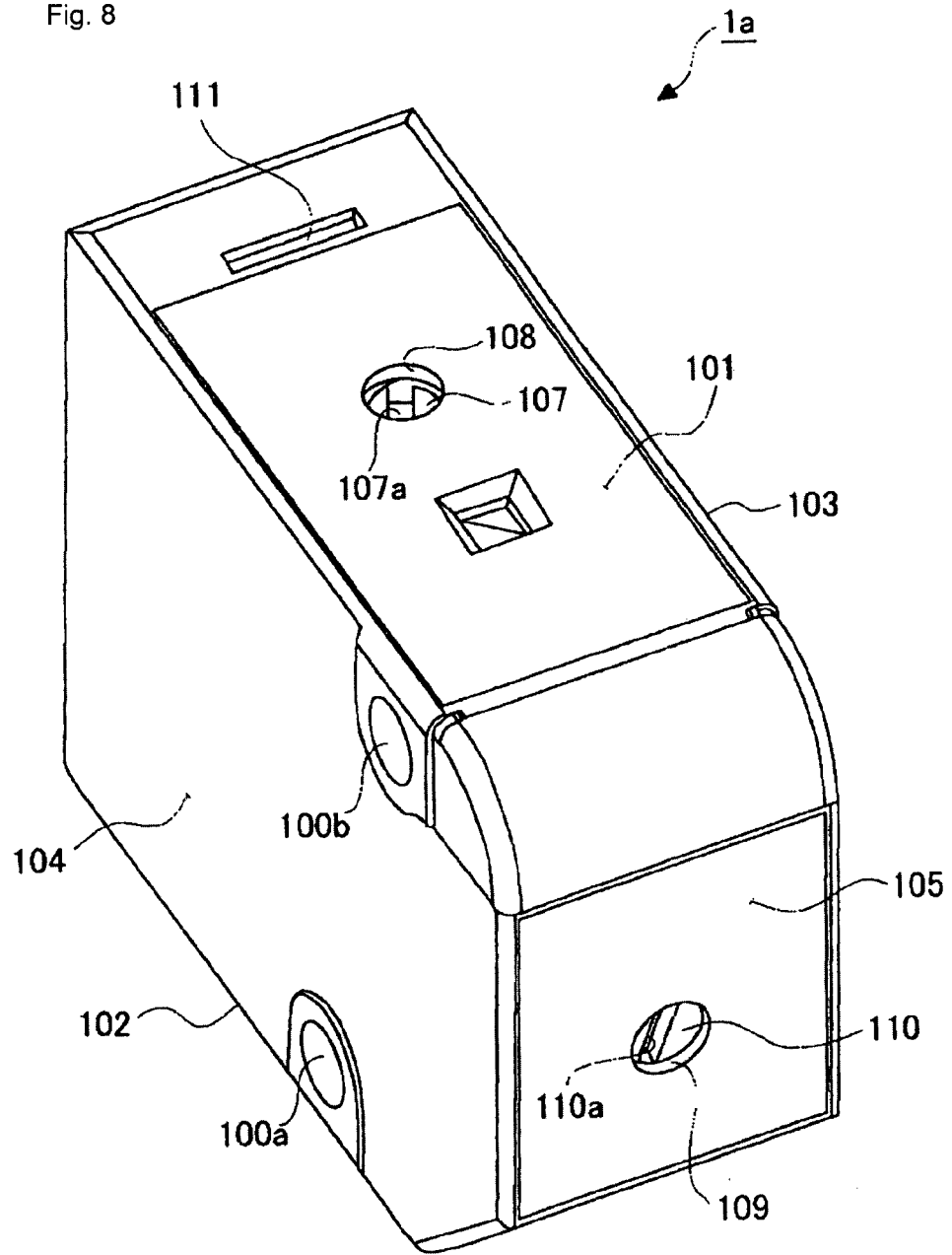
FIG. 8 is a right, rear perspective view of a sensor head.
Figure 9:
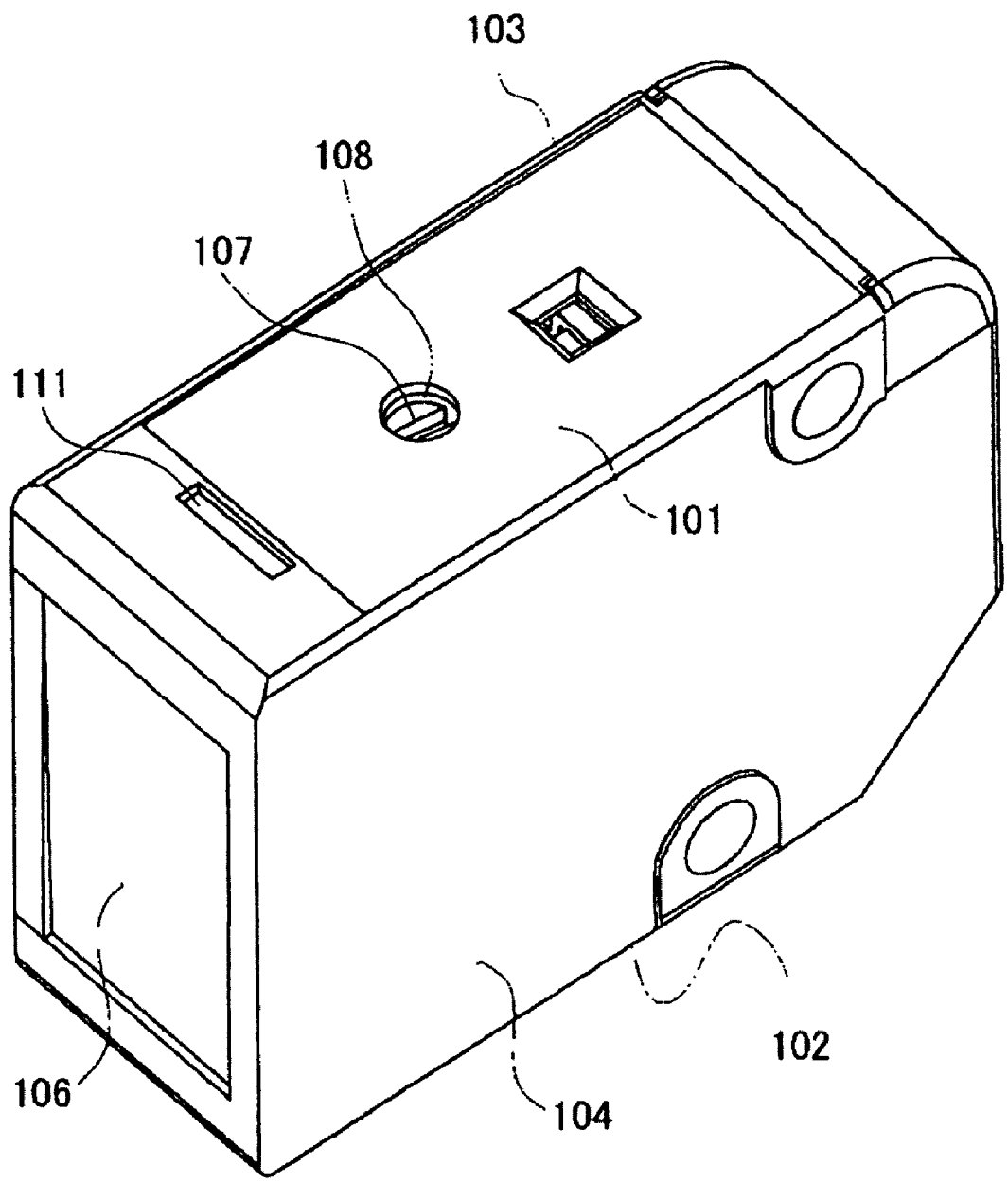
FIG. 9 is a left, front perspective view of a sensor head.

In FIGS. 8 and 9, there are respectively shown a right, rear perspective view of a sensor head and a left, front perspective view of a sensor head. As can be clearly understood from the figures, a case of a sensor head unit 1a is a box in the shape of a rectangular prism having a relatively small width constructed of: a top surface plate 101; a bottom surface plate 102; a left side surface plate 103; a right side surface plate 104; and a rear surface plate 105. A light projecting and receiving window 106 is provided in the front surface side of the sensor head unit 1a and a window plate is fittingly inserted therein that is made of a plastic transmitting laser light (for example, infrared rays), but having a property intercepting visual light. Note that in the figures, a symbol 111 indicates an engaging groove for mounting an option unit described later.

A circular hole 108 is formed in the top surface plate 101 of the case of the sensor head unit 1a and an optical axis adjusting volume control 107 is disposed in the circular hole 108. A circular hole 109 is also formed in the rear surface plate 105 of the case and a light beam adjusting volume control 110 is disposed in the circular hole 109. The optical axis adjusting volume control 107 and the light beam adjusting volume control 110 each are a rotary operator in the shape of a cylinder and slots 107a and 110a each engaging with the distal end in the shape of a minus mark of a screw driver are formed on the distal end surfaces of the respective volume controls 107 and 110.

Figure 10:
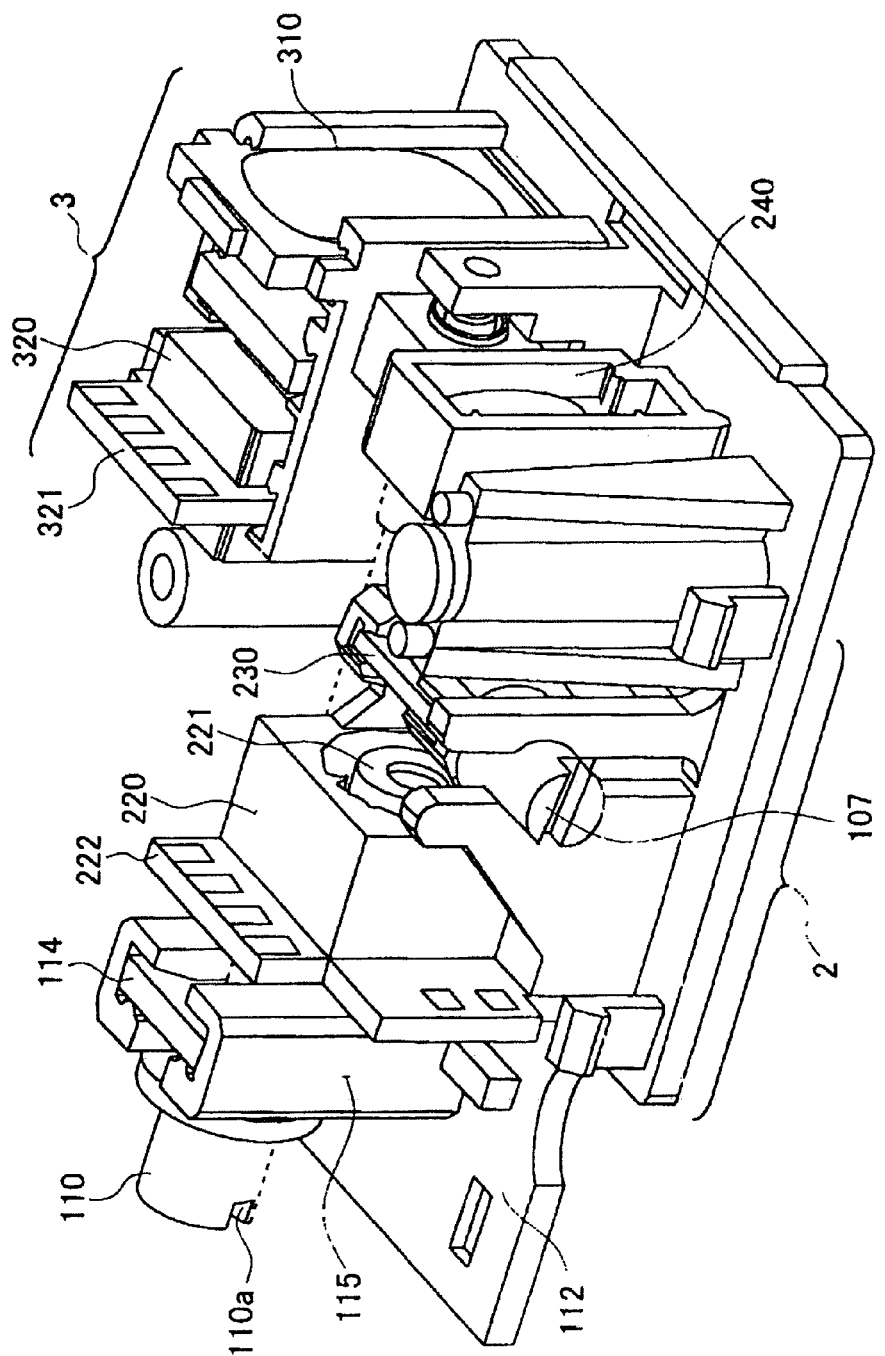
FIG. 10 is a right, top perspective view of an optical base on which various optical part blocks are mounted.

In FIG. 10, there is shown a right, top perspective view of an optical base on which there are mounted various optical part blocks constituting a photoelectric sensor. As shown in the figure, mounted on the optical bases 112 are various optical parts including a light projecting section 2 and a light receiving section 3 as main sections.

The light projecting section 2 includes; a light source block 220; an optical axis adjusting block 230; and a light projecting lens block 240. The light receiving section 3 includes: a light receiving lens block 310; and a photoelectric conversion block 320.

Figure 11:
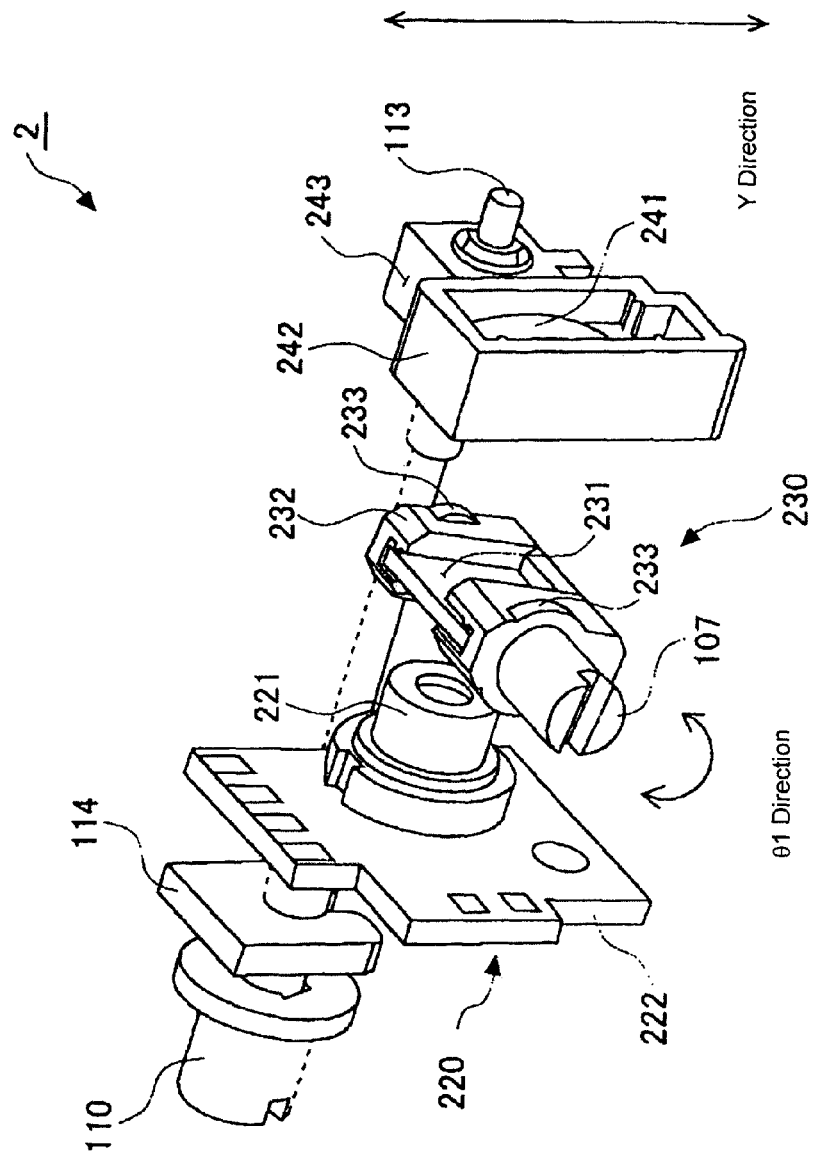
FIG. 11 is an exploded perspective view showing optical part blocks constructing a light projecting section, which is picked from FIG. 10.
Figure 12:
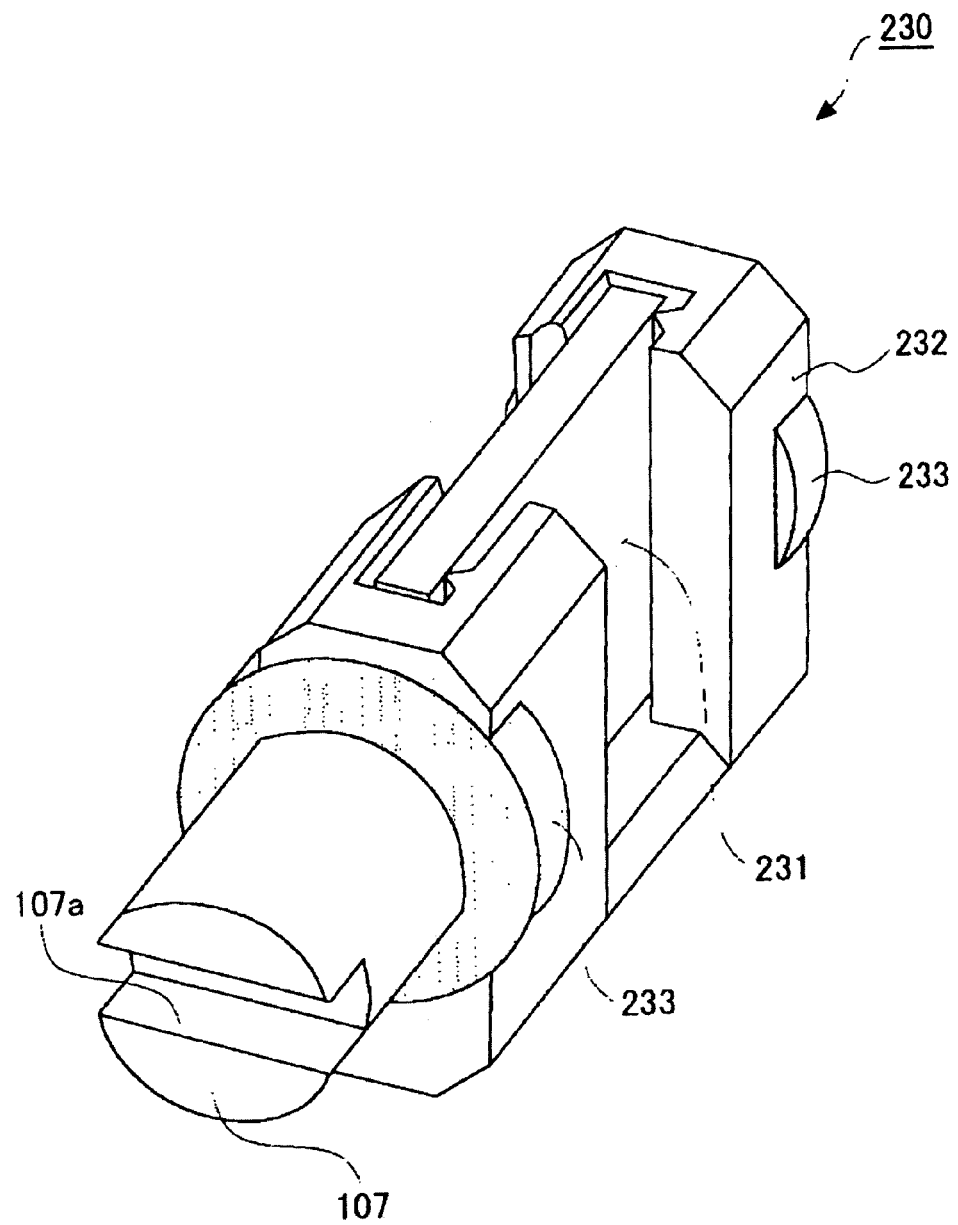
FIG. 12 is a perspective view of an optical axis adjustment block.
Figure 13:
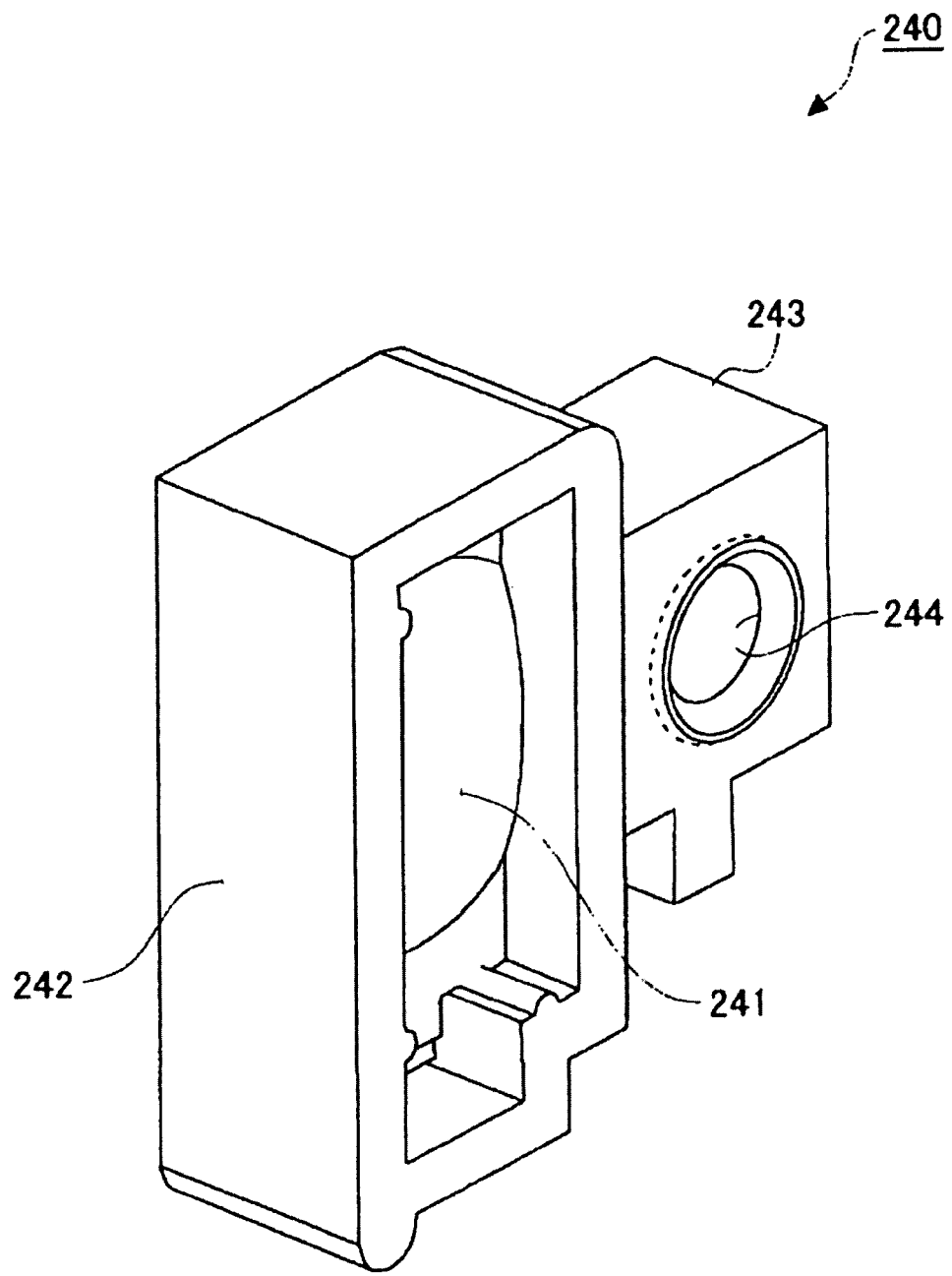
FIG. 13 is a perspective view of a light projecting lens block.

In FIG. 11, there is shown an exploded perspective view showing optical part blocks constructing a light projecting section, which is picked from FIG. 10. The light source block 220 included in the light projecting section 2, as shown in the figure, has therein: a laser element 221; and a light projecting base plate 222 supporting the laser element 221. The optical axis adjusting block 230 included in the light projecting section 2, as shown in FIG. 12, has therein: a plane-parallel glass plate 231; a glass holder 232 in which the plane-parallel glass plate 231 is press-inserted and held; a rubber O ring providing a rotation sliding surface of the glass holder 232; and an optical axis adjusting volume control 107 protruded from the glass holder 232 in a single piece integrated therewith. The optical axis adjusting volume control 107 is a rotary operator in the shape of a cylinder and a slot 107a into which a screw driver with the distal end in the shape of a minus mark is inserted is formed in the distal end surface of the optical axis adjusting volume control 107. The light projecting block 240, as shown in FIG. 13, includes: a light projecting lens 241; a lens holder 242 supporting the light projecting lens 241; and a guide block 243 protruding to the side of the lens holder 242 a single piece integrated with the lens holder 242. Formed in the guide block 243 is a threaded hole 244 into which an externally threaded rod described later is screwed.

Returning to FIG. 10, the light source block 220 is fixed to the optical base 112 in a single piece integrated therewith. In contrast thereto, the light projecting lens block 240 is movable with respect to a distance from the light source block 220 in a state facing the light source block 220. That is, a shaft 113 which is a threaded rod included in a ball screw mechanism, as shown in FIG. 11, is inserted through the guide block 243 included in the light projecting lens block 240, while on the other hand, the light adjusting volume control 110 is provided at the other end of the shaft 113 with a shaft presser metal member 114 interposed therebetween. The shaft presser metal member 114 is, as shown in FIG. 10, press inserted from above the shaft support member 115 into and firmly held by a shaft support member 115 erected on the optical base 112. Therefore, by rotating the light beam adjusting volume control 110 with a screw driver with the distal end in the shape of a minus mark or the like, the light projecting block 240 advances and retreats along the optical axis with the help of a ball screw advancing and retreating action between the guide block 243 and the shaft 113. As a result, the light beam adjusting action described above is realized. Note that in FIG. 10, description is not given of the light receiving section 3 in a very detailed manner since the section is not a main feature of the present invention and a symbol 321 indicates a light receiving element substrate on which light receiving elements are mounted.

With the sensor head unit 1a having the construction described above adopted, by rotating the optical axis adjusting volume control 107 in the outer appearance view of FIG. 8 with the distal end in the shape of a minus mark of a screw driver, the optical axis adjusting action described with reference to FIGS. 2A, 2B and 3A, 3B can be realized, while on the other hand, by rotating the light beam adjusting volume control 110 with the distal end in the shape of a minus mark of a screw driver inserted in the slot, the light beam adjusting operation can be realized as described above with reference to FIG. 7. Therefore, even after the sensor head unit 1a is mounted to a support member using the mounting holes 100a and 100b in an actual scene, an optical axis deflection angle and a light collecting point distance of a projected beam is finely adjusted with freedom by properly operating the optical axis adjusting volume control 107 and the light beam adjusting volume control 110 to perform correct positioning even for a detection object of a small size located in a comparatively remote place, thereby enabling a detection operation with good precision and sensitivity.

Then, description will be given of a contrivance to expand a function of a photoelectric sensor unit by mounting a newly developed option unit to the photoelectric sensor unit with a light beam adjusting function described above.

Figure 14:
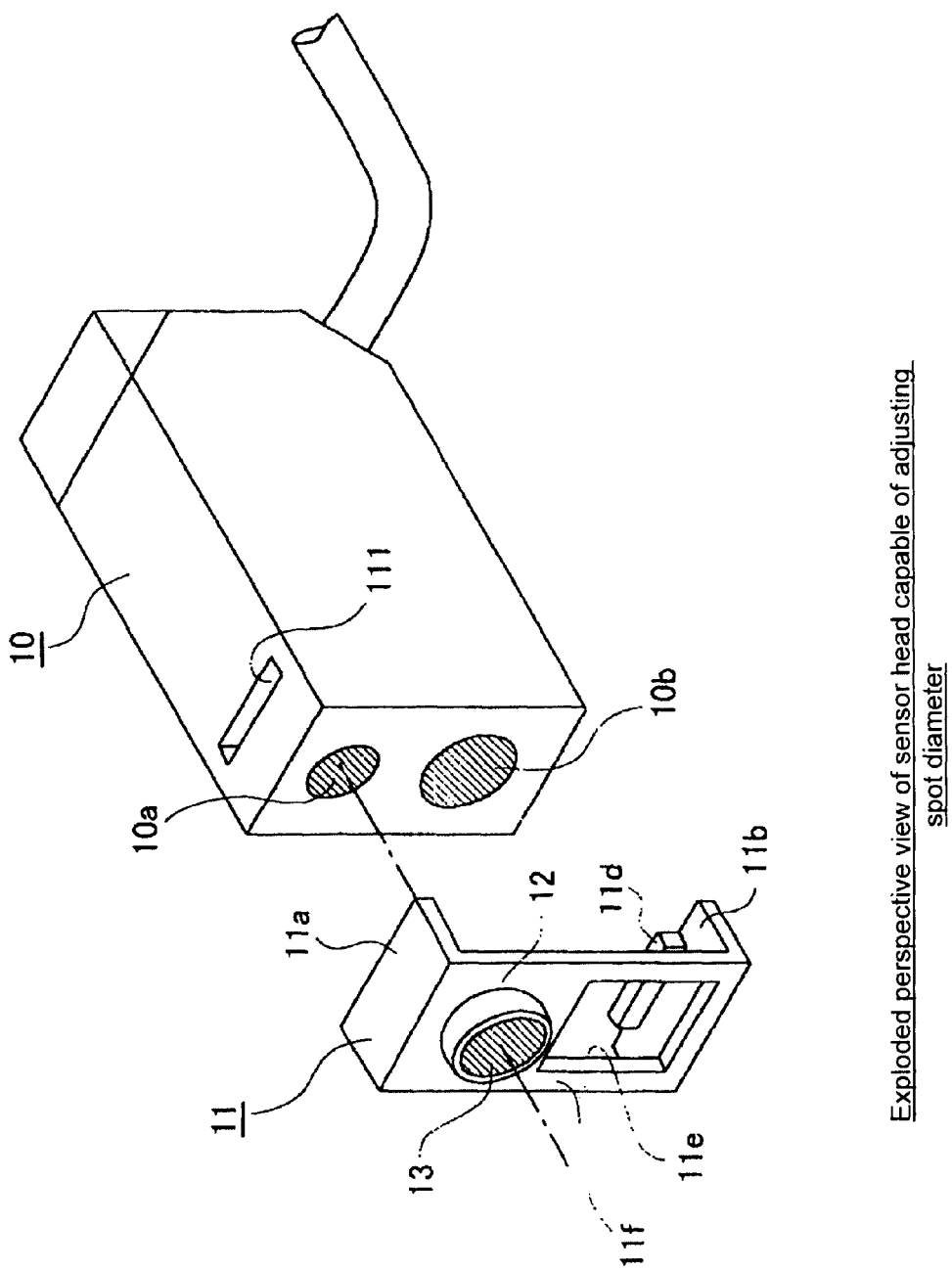
FIG. 14 is an exploded perspective view of a sensor head capable of adjusting a spot diameter.

A photoelectric sensor of the present invention, as shown in FIG. 14, includes: a sensor head case 10 and an option unit 11. The sensor head case 10 is made of plastic and fabricated in the shape of a rectangular prism with a comparatively narrow width and a light projecting window 10a and a light receiving window 10b are provided on the front surface side. Engaging grooves 111 each for mounting the option unit 11 are formed in the top surface and the bottom surface of the fore end of the sensor head case 10.

Figure 15A:
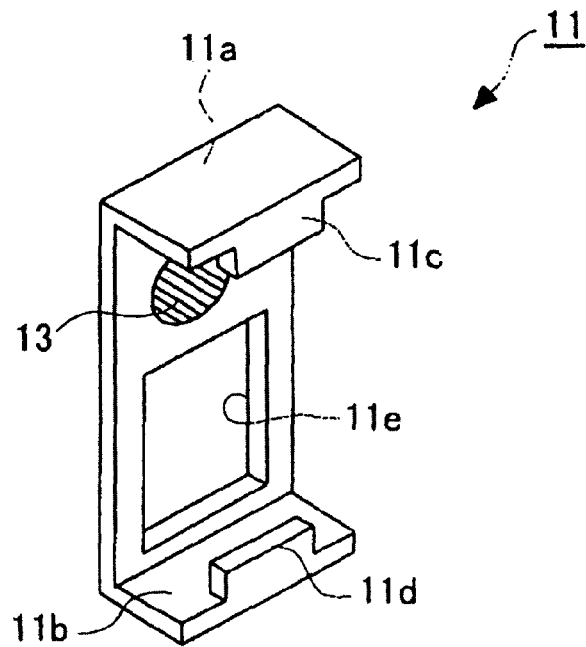
FIGS. 15A and 15B are descriptive views of an option unit capable of adjusting a spot diameter.

On the other hand, the option unit 11 is a plastic member in the shape in section of a Greek capital letter Π, having a front surface plate 11f; and an upper support 11a and a lower support 11b provided at the top and bottom of the front face plate 11f, and a cylindrical lens holder 12 and a tetragonal light receiving window 11e are provided on and in the front surface plate 11f. A light beam changing lens 13, which is a main feature of the present invention, is fittingly inserted into the lens holder 12. Engaging nails 11c and 11d engaging in the engaging grooves 111 of the case 10, as shown in FIG. 15A, are provided on the inner sides of free ends of the upper support 11a and the lower support 11b, respectively.

Therefore, by pressing the option unit 11 to the front face of the case 10, the upper support 11a and the lower support 11b are bent outwardly to cause the engaging nails 11c and 11d at the free ends to engage in the engaging grooves 111 of the case 10, thereby mounting the option unit 11 to the case 10 with certainty.

In this mounting state, not only is the light beam changing lens 13 of the option unit 11 side disposed in front of the light projecting window 10a of the case 10 side, but laser light emitted from a laser light source included in the case 10 is subjected to beam shaping by both of the light projecting lens 24 in the case 10 and the light beam lens 13 held in the option unit 11 as shown in FIG. 18B since the centers of the light projecting window 10a and the light changing lens 13 are in exact alignment with each other and thereafter, the laser light in a specific beam shape is projected into the detection object region for illumination.

Figure 15B:
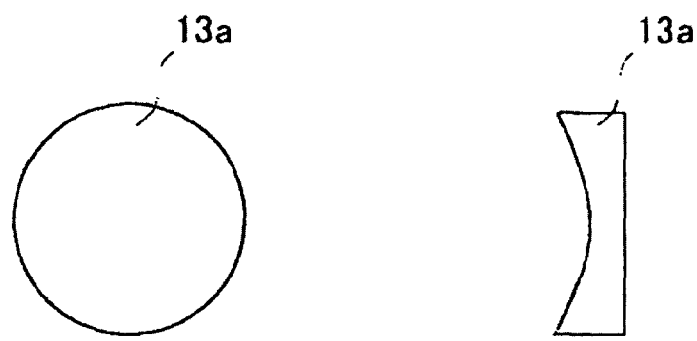

A shape of the projected beam launched to the detection object region at this time is affected by a characteristic of a light beam changing lens 13. Lenses with various characteristics can be adopted as the light beam changing lens 13. A lens indicated by a symbol 13a in FIG. 15B is a single concave lens capable of a uniform diffusion along the entire periphery. This single concave lens 13a includes: one surface of a flat plane and the other surface being spherical or concave outwardly. Therefore, light impinging on the flat plane side is diffused and emitted at the spherical surface side.

As shown in FIG. 18B, included in the sensor head case 10 is the light projecting lens 24 freely advancing and retreating in the optical axis using a ball screw mechanism and a distance between the light projecting lens 24 and the laser light source 22 can be freely changed by rotation of the light beam adjusting volume control 110. Note that a concrete construction of the ball screw mechanism and the light beam adjusting volume control are as described above with reference to FIG. 11 or the like.

Figure 16A:
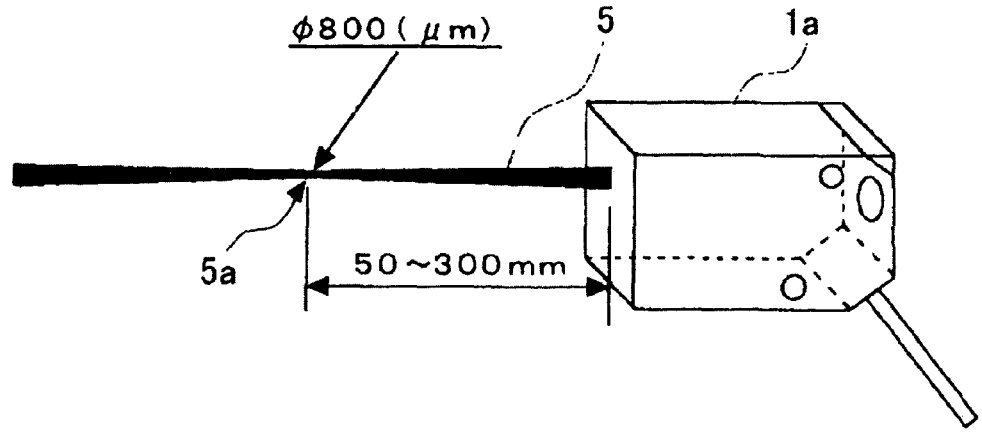
FIGS. 16A and 16B are a descriptive view for workings in a sensor head unit and a graph of a characteristic of spot diameter adjustment therewith.
Figure 16B:
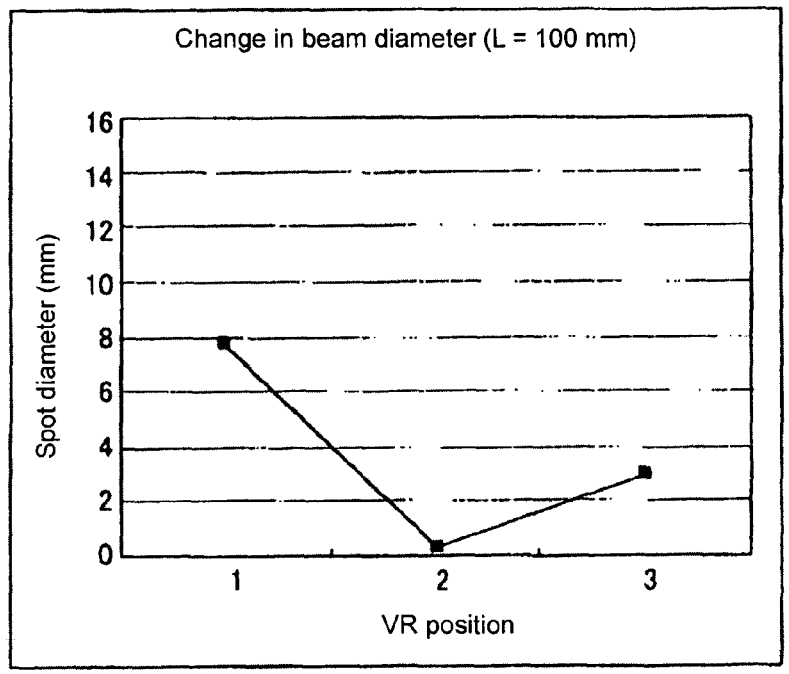

It is assumed herein that a characteristic of the sensor head unit 1a is as described in FIGS. 16A and 16B. That is, by effecting the light beam adjusting function, a distance up to a light collecting point 5a of the projected beam 5 can be adjusted in the range of 50 to 300 mm from the sensor head unit 1a and a spot diameter of the light collecting point 5a is on the order of 800 µm. It is assumed furthermore that a relationship between an operating amount of the light beam adjusting volume control and a spot diameter, as shown in FIG. 16B, changes in a linear fashion on straight lines connecting between three points such as 8 mm in spot diameter at a volume control position [1], 800 µm in spot diameter at a volume control position [2] and 3 mm in spot diameter at a volume control position [3].

By using the photoelectric sensor unit 1a with the construction described above and the option unit 11 into which the lens 13a capable of a uniform diffusion along the entire periphery fits shown in FIG. 15B, a spot diameter of the projected beam 5 emitted from the lens 13a, as shown in FIGS. 17A, 17B and 17C, changes in a predetermined range including a large one, a middle one and a small one as a position of the light projecting lens 24 of FIG. 18B is displaced to a, b and c.

Therefore, according to this example, the sensor had unit 1a itself generates a projected beam 5 which is a converging type beam as a characteristic, while on the other hand, with the option unit 11 mounted, a shape of a projected beam 5 emitted from the option unit 11, as shown in FIG. 17, can be changed into a circular diffuse type. That is, a beam diameter W1 in FIG. 18 is changed to a large one or a small one in a predetermined range by rotation of the light beam adjusting volume control 110 and at the same time a proper circular beam spot is formed on the detection object 4, thereby enabling realization of an optimal instrumentation environment.

Figure 19:
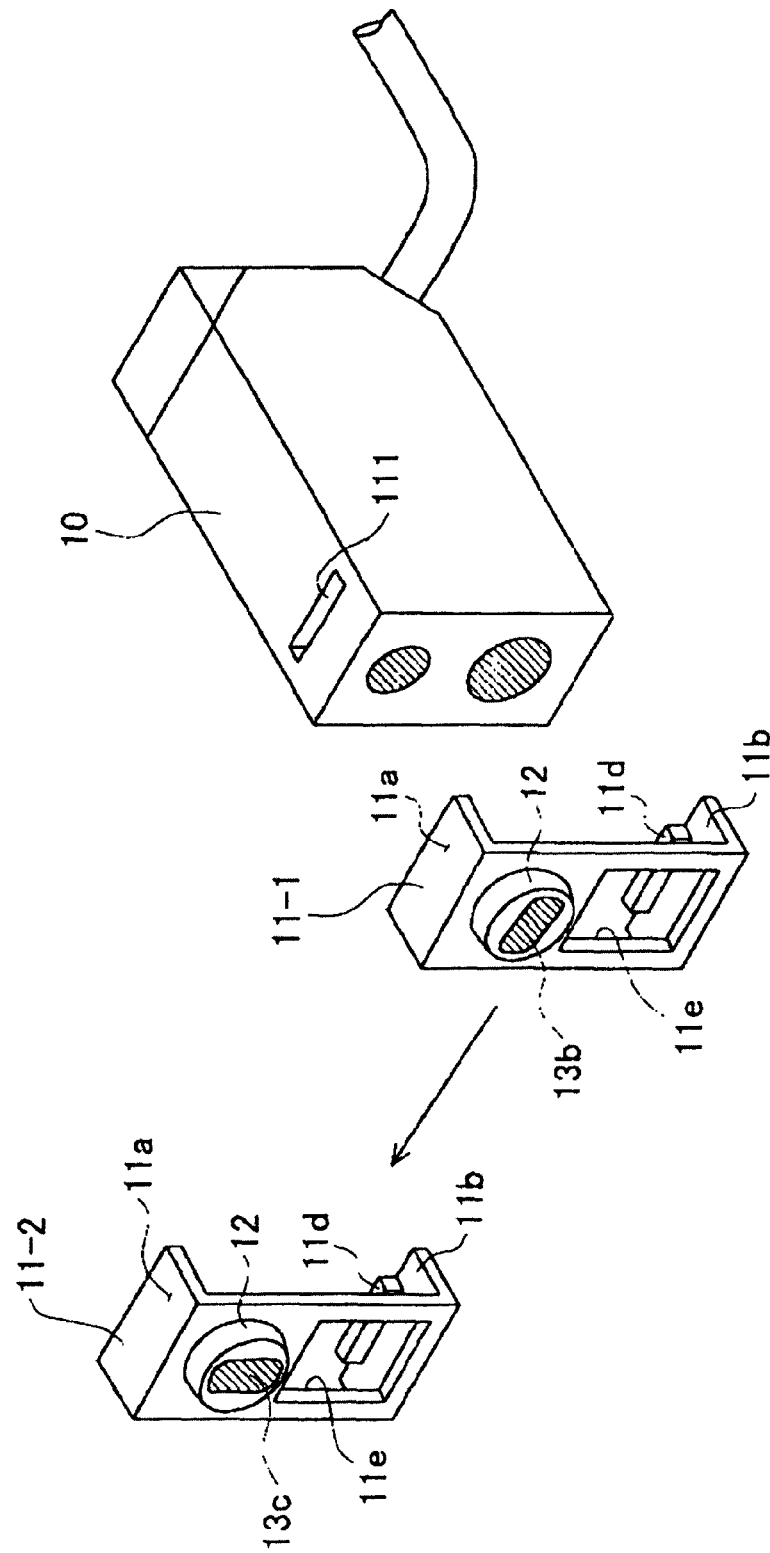
FIG. 19 is an exploded perspective view of a sensor head capable of adjusting a width of slit light.

As light beam changing lenses 13 to be mounted to the lens holder 12 of the option unit 11, no specific limitation is imposed on a lens capable of a uniform diffusion along the entire periphery, but there can be used a plane diffuse type developing a light flux in a plane at angular positions of 0° and 180° only on a circle. In FIG. 19, there is shown an example using a plane diffuse type light beam changing lens like this.

In this example, as shown in FIG. 19, two kinds of option units 11-1 and 11-2 are prepared for use in a common sensor head case 10. A plane diffuse type light beam changing lens 13b diffusing light in a horizontal direction is fitted in the lens holder 12 of the one option unit 11-1, while a plane diffuse type light beam changing lens 13c diffusing in a vertical direction is fitted in the other option unit 11-2. The plane diffuse type light beam changing lens is in a shape in section narrow and long in the front view, square or rectangular in the side view, and concave on one side and flat on the other side in the plan view as shown in FIG. 20B.

Figure 21A:
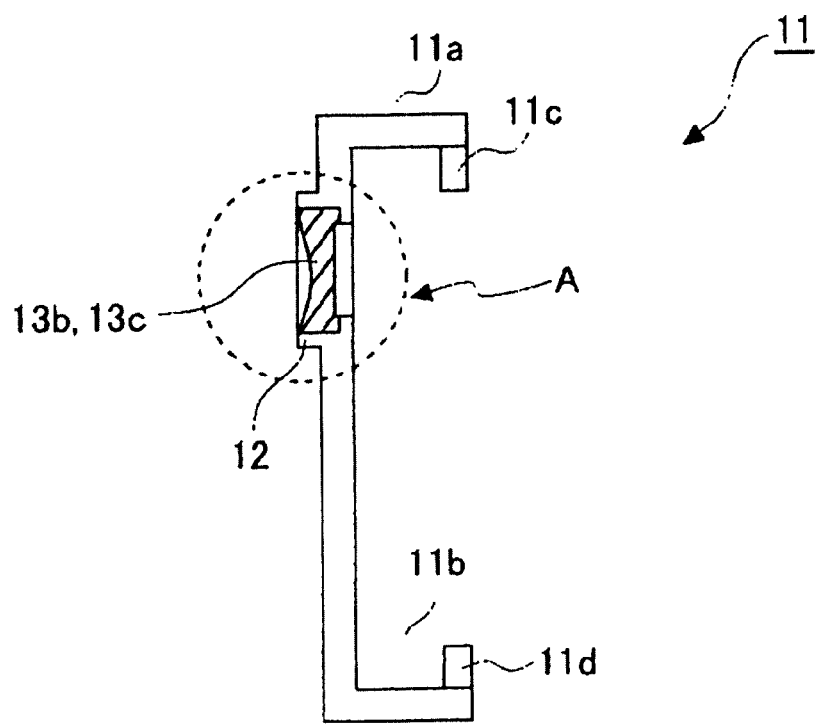
FIGS. 21A and 21B are descriptive views of a lens holding structure of an option unit.
Figure 21B:
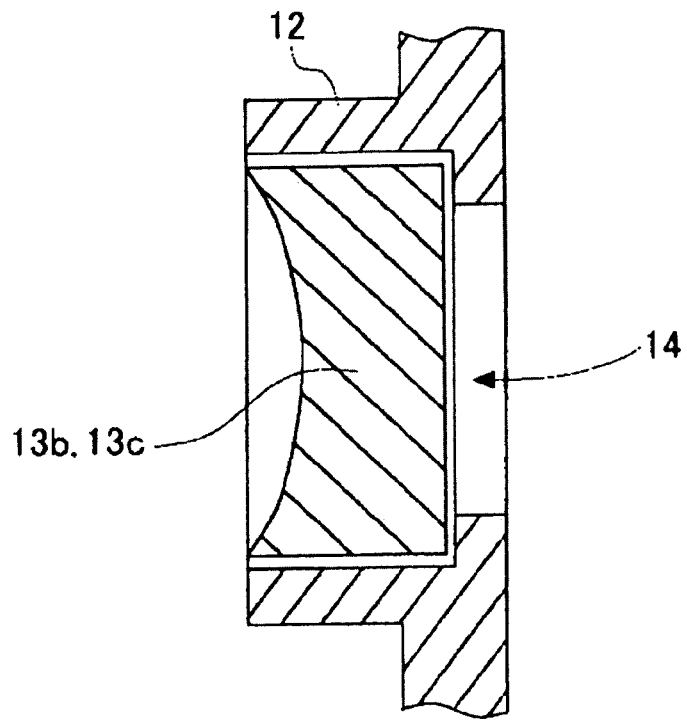

The plane diffuse type light beam changing lenses 13b and 13c are fixed, for example, by press fitting into the lens holder 12 as shown in FIGS. 21A and 21B. In the figures, a symbol 14 is a window formed in alignment with the option unit lenses 13b and 13c.

Figure 23A:
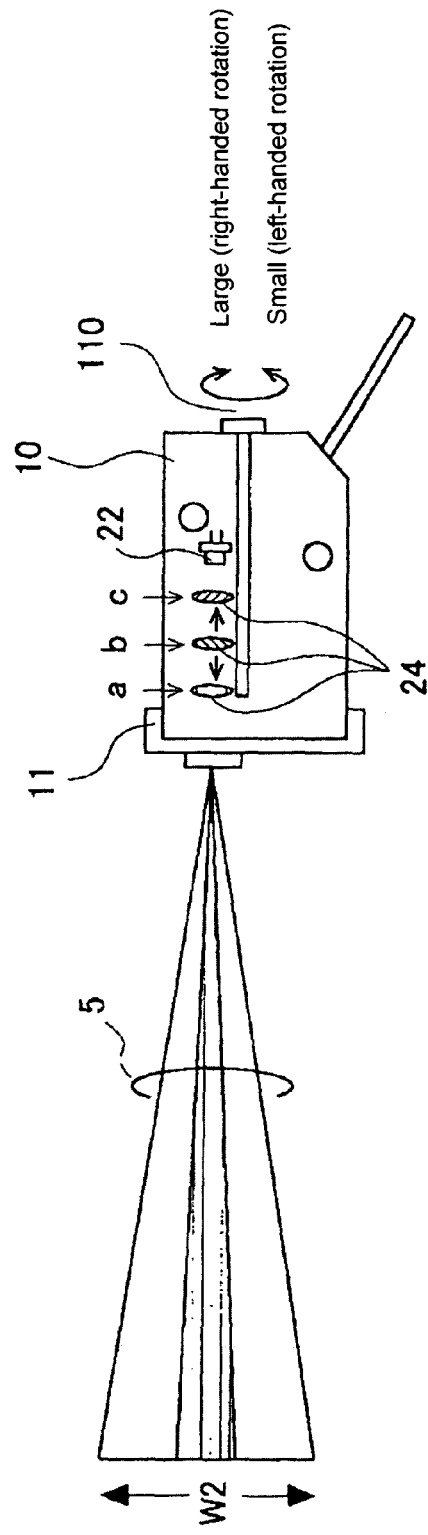
FIGS. 23A and 23B are descriptive views of a sensor head of a slit light illumination.
Figure 23B:
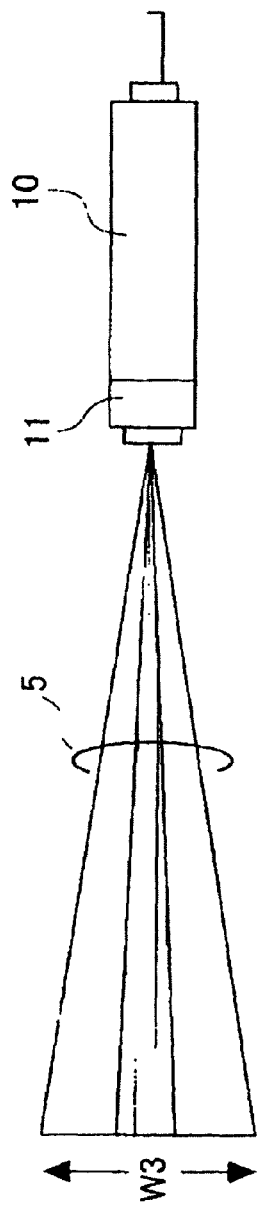

By selecting one of the two kinds of option units 11-1 and 11-2 shown in FIG. 19 to mount the selected one to the sensor head case 10, a shape of the projected beam can be made, as shown in FIGS. 23A and 23B, a so-called line beam diffused in a vertical direction or in a horizontal direction, and a projected light beam 5 is realized in the shape of a line beam having a beam width W2 in the vertical direction or a beam width W3 in the horizontal direction with the help of a light beam changing function in the sensor head case 10 and in addition, the beam widths can be arbitrarily changed by manipulating the light beam adjusting volume control 110.

Figure 24:
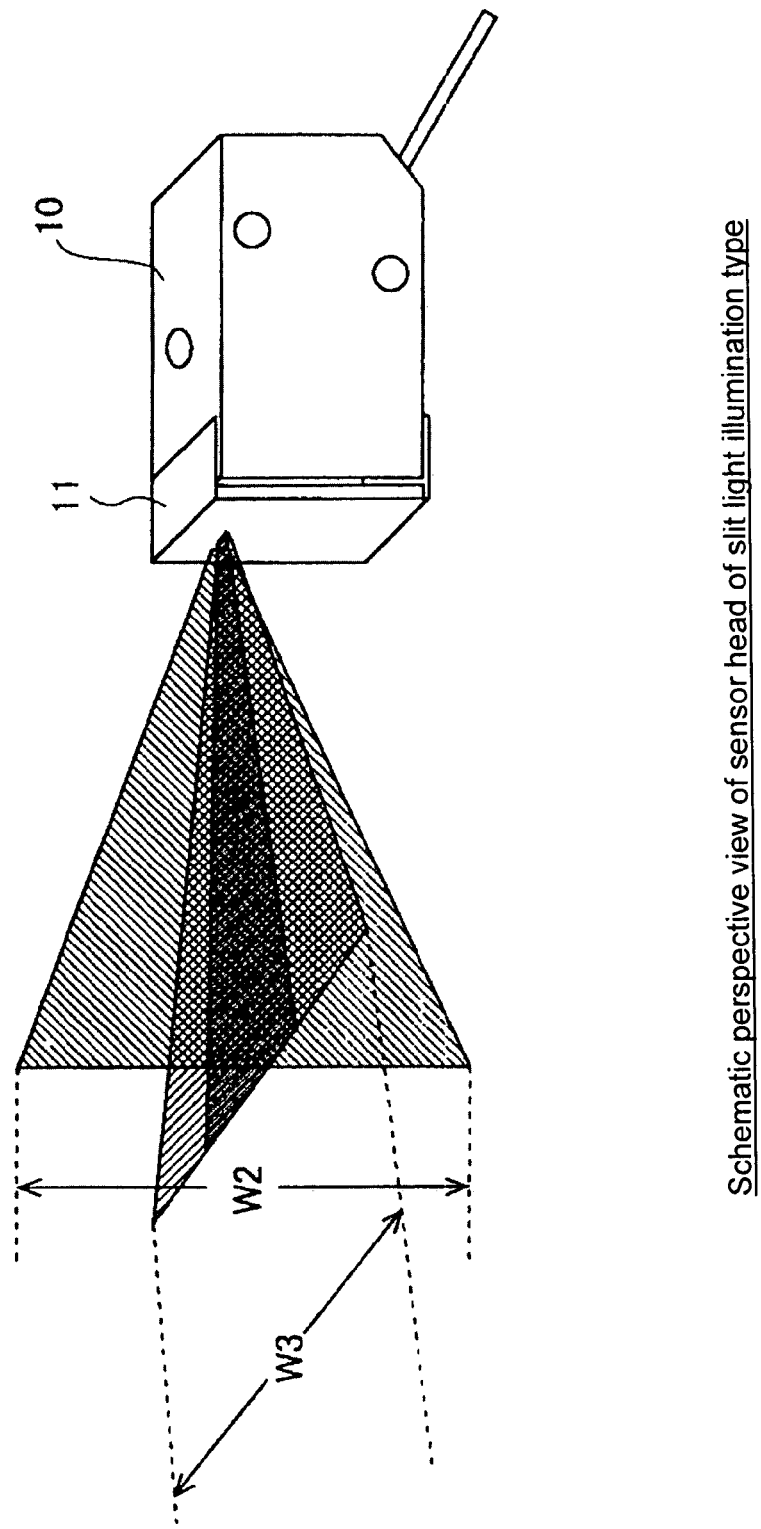
FIG. 24 is a schematic perspective view of a sensor head of a slit light illumination type.

That is, by adopting the option unit 11-2 as shown in FIG. 24, a line beam with a width W2 diffused in a vertical direction can be obtained, while by adopting the option unit 11-1, a line beam with a width W3 diffused in a horizontal direction can be realized.

Figure 22A:
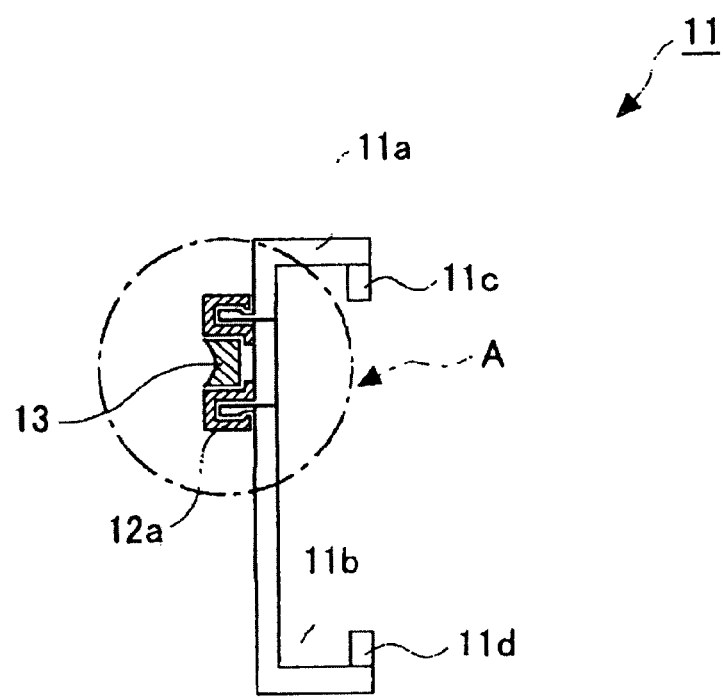
FIGS. 22A and 22B are descriptive views of a lens holding structure of an option unit.
Figure 22B:
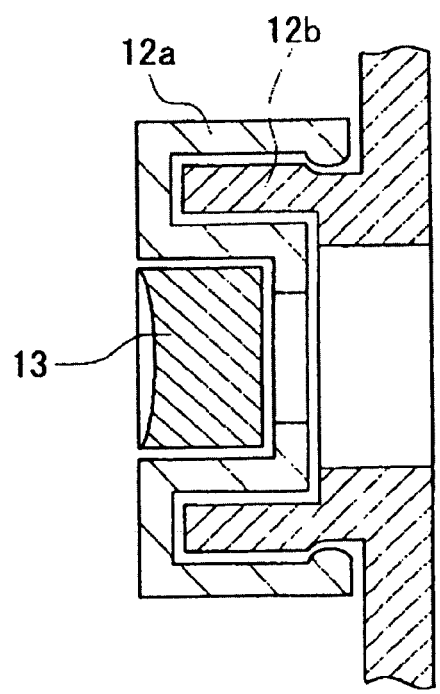

With a construction in which a lens holder is, as shown in FIGS. 22A and 22B, constructed with an internal cylinder 12b protruding from the option unit side and an outer cylinder portion 12a provided outside thereof so as to surround, and plane diffuse type light beam changing lens 13b or 13c is press-fitted in a central recess of the outer cylinder portion 12a, a diffusion direction of the plane diffuse light beam lens can be changed to a direction with an arbitrary angle by rotating the outer cylinder portion 12a about the optical axis relative to the internal cylinder 12b and., furthermore, with such a construction adopted, a horizontal direction diffusion characteristic and a vertical direction diffusion characteristic shown in FIG. 24 can be freely changed therebetween while adopting a common option unit 11.

Figure 25A:
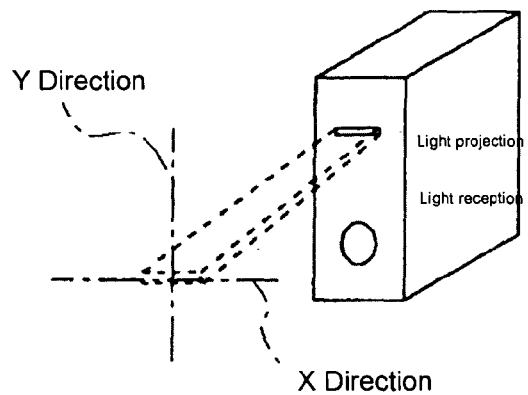
FIGS. 25A and 25B are a view and a graph describing workings in width adjustment of slit light.
Figure 25B:
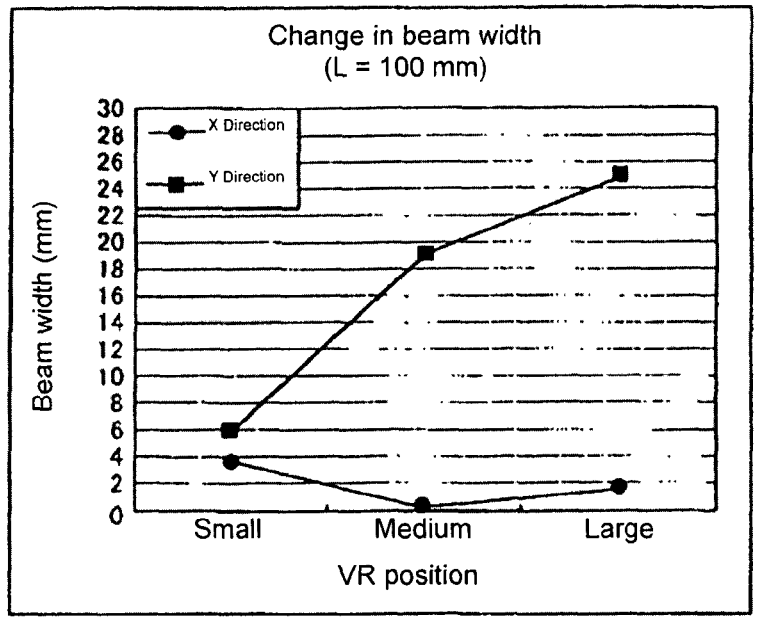

In FIGS. 25A and 25B, there are shown a view and a graph describing workings in width adjustment of slit light in an option unit with such a construction. If dimensions (X, Y) of slit light are defined as shown in FIG. 25A, beam widths in the X direction and the Y direction can also be freely changed, as shown in FIG. 25B, according to a position of a light projecting lens accompanying manipulation of the light beam volume control. Therefore, by properly designing a characteristic of a plane diffuse type lens, a project beam having a desired beam shape can be realized with the help of advancing and retreating adjustment of a light projecting lens based on a light beam adjusting function.

Figure 26:
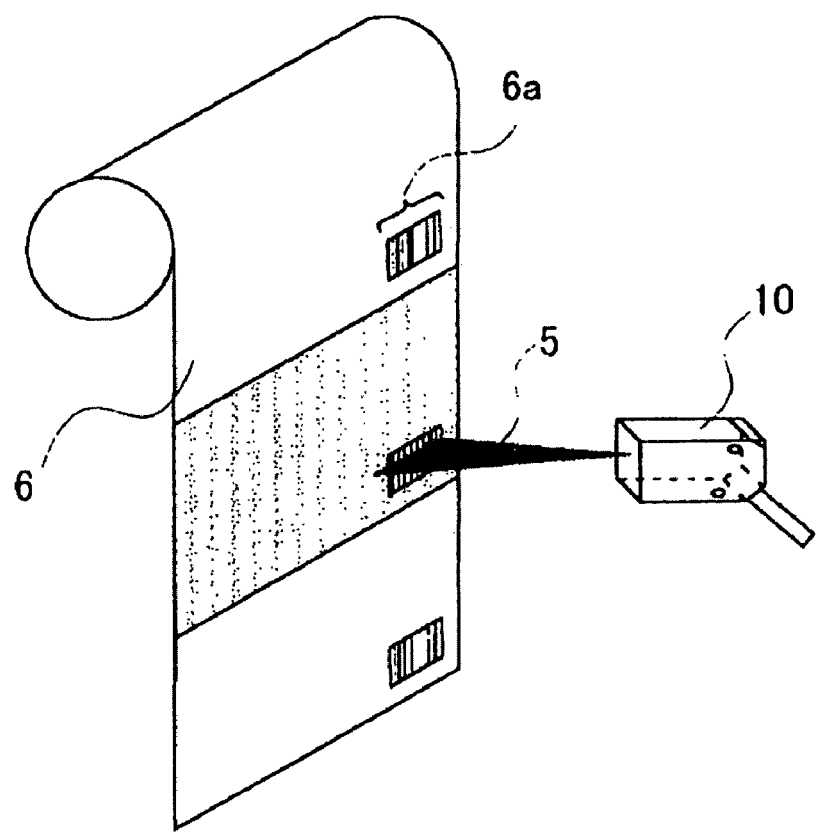
FIG. 26 is a first example application of a slit light illumination type sensor.

In FIG. 26, there is shown an concrete example application of a sensor using a projected light 5 in the shape of a line beam realized in this way. As this example, in a continuous production process of, for example, bags on each of which a pattern is depicted all over the surface, only a bar code 6a portion of a continuous bags 6 is illuminated with a line shaped projected light beam 5, thereby enabling correct reading of a bar code on each bag without receiving an influence of a pattern present in the neighborhood. Note that in a case where a detection light in the shape of a line beam is adopted, CCD or the like are properly used as a light receiving element of the light receiving section.

Figure 27:
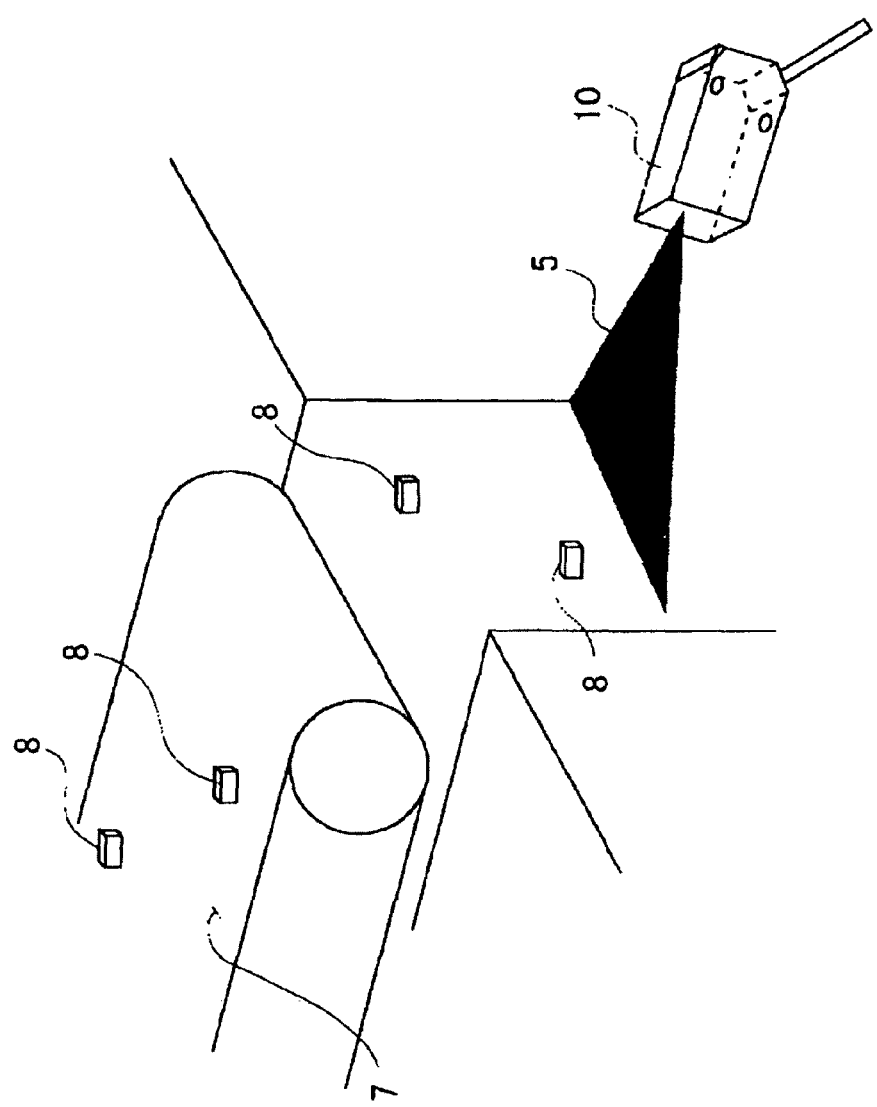
FIG. 27 is a second example application of a slit light illumination type sensor.

On the other hand, in an example of FIG. 27, by further spreading a width of the projected light beam 5 in the shape of a line beam, an illumination region of the projected light beam 5 is spread to a transport width of a conveyor 7, thereby enabling effective detection of a small part 8 falling down from the conveyor 7 with a single sensor.

According to a photoelectric sensor of a sensor head case and an option unit combined of the present invention, as described above, various example applications are expected in the industrial world by arbitrarily changing a shape of the projected beam 5.

According to the present invention, as is clear from above description, a photoelectric sensor of a long distance type of this kind enables setting freedom in various aspects associated with a projected beam to be improved.

Especially, according to the present invention, an optical axis deflection angle of a projected beam can be finely adjusted even in a state where a sensor head case is fixed and furthermore, a shape of a projected beam can be freely changed in setting while maintaining common use of a sensor head case itself.

What is claimed is:

1. A photoelectric sensor comprising:
    a light projecting section projecting detection medium light to a detection object region; and
    a light receiving section receiving reflecting light or transmitted light from the detection object region, the sections being in a single piece or in separate pieces, wherein the light projecting section includes:
    a light source generating the detection medium light;
    a light projecting lens for collimating or collecting the detection medium light from the light source to form a beam spot or a light collecting point in the detection object region;
    a transparent light transmissive element interposed between the light source and the light projecting lens; and
    a deflection angle adjusting arrangement capable of finely adjusting an optical axis deflection angle of the detection medium light projected to the detection object region from the light projecting section, the deflection angle adjusting arrangement being arranged such that at least one of the light source, the light projecting lens and the transparent light transmissive element, is movable with respect to another of the light source, the light projecting lens and the transparent light transmissive member.

2. The photoelectric sensor according to claim 1, wherein the transparent light transmissive element has a flat incidence plane for the detection medium light and a flat emission plane therefor, and wherein a change in an incidence angle of the detection medium light is induced by a change in a position of the transparent light transmissive element relative to the light source.

3. The photoelectric sensor according to claim 1, further comprising a light beam adjusting device for performing distance adjustment of a light collecting point of light emitted from the light projecting lens.

4. A photoelectric sensor according to claim 1, wherein the projection lens is movable in a direction essentially parallel to its optical axis.

5. A photoelectric sensor according to claim 1, wherein the transparent light transmissive member is rotatable about and axis which is essentially orthogonal to an optical axis of the light projection lens.

6. A photoelectric sensor according to claim 1, wherein the transparent light transmissive element is movable in a direction which is essentially orthogonal to an optical axis of the light projection lens.

7. A photoelectric sensor according to claim 1, wherein the transparent light transmissive element is a plane-parallel glass plate.

8. A photoelectric sensor according to claim 1, wherein the transparent light transmissive element is a non-plane-parallel glass plate.

9. A photoelectric sensor according to claim 8, wherein the transparent light transmissive element is essentially wedge-shaped.

10. A photoelectric sensor according to claim 1, wherein the light source is movable in a direction which is essentially orthogonal to an optical axis of the light projection lens.

11. A photoelectric sensor comprising:
- a light projecting section projecting detection medium light to a detection object region; and
- a light receiving section receiving reflecting light or transmitted light from the detection object region, the sections being in a single piece or in separate pieces, wherein the light projecting section includes:
- a light source generating the detection medium light;
- a light projecting lens for collimating or collecting the detection medium light from the light source to form a beam spot or a light collecting point in the detection object region; and
- deflection angle adjusting means capable of finely adjusting an optical axis deflection angle of the detection medium light projected to the detection object region from the light projecting section,
- wherein the deflection angle adjustment means is a plane-parallel glass plate, interposed in an optical path between the light source and the light projecting lens, and supported rotatably about an axis orthogonal to the optical path.

12. The photoelectric sensor according to claim 11, wherein the light source and the light projecting lens are integrally connected to an optical base, wherein the plane-parallel glass plate is rotatably supported on the optical base by a glass holder, and wherein a volume control operator for rotation of the plane-parallel glass plate is provided to the glass holder.

13. A photoelectric sensor comprising:
- a sensor head case having a light projecting window in the front surface; and
- a selectively interchangeable option unit, capable of being mounted in a selectively mountable/demountable manner at the front surface of the sensor head case, and holding a light beam changing lens at a position aligned with the light projecting window by way of a lens holder, wherein the sensor head case contains:
- a light source generating detection object light;
- a light projecting lens collecting the detection medium light from the light source to emit the detection medium light from the light projecting window;
- a transparent light transmissive element which is interposed between the light source and the light projecting lens; and
- light beam adjusting arrangement for performing distance adjustment of a light collecting point of light emitted from the light projecting window said light beam adjusting arrangement comprising a device for moving at least of the light source, the light projecting lens and the transparent light transmissive element, with respect to another of the light source, the light projecting lens and the transparent light transmissive element.

14. The photoelectric sensor according to claim 13, wherein the light beam changing lens is a light beam changing lens capable of a uniform diffusion along an entire periphery thereof.

15. The photoelectric sensor according to claim 13, wherein the light beam changing lens is a plane diffusion type light beam changing lens.

16. The photoelectric sensor according to claim 13, wherein the lens holder holding the light beam changing lens is rotatable about an optical axis.

* * * * *